(12) United States Patent
Minamitani et al.

(10) Patent No.: US 10,756,313 B2
(45) Date of Patent: Aug. 25, 2020

(54) THIN POWER STORAGE DEVICE AND PRODUCTION METHOD THEREOF

(71) Applicant: SHOWA DENKO PACKAGING CO, LTD., Isehara-shi, Kanagawa (JP)

(72) Inventors: Koji Minamitani, Isehara (JP); Yuji Minamibori, Isehara (JP); Kensuke Nagata, Isehara (JP); Shunsuke Saito, Minato-ku (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 150 days.

(21) Appl. No.: 16/033,247

(22) Filed: Jul. 12, 2018

(65) Prior Publication Data

US 2018/0323410 A1 Nov. 8, 2018

Related U.S. Application Data

(62) Division of application No. 14/829,096, filed on Aug. 18, 2015, now Pat. No. 10,079,374.

(30) Foreign Application Priority Data

Aug. 18, 2014 (JP) ................................ 2014-165690
Jul. 8, 2015 (JP) ................................ 2015-137011

(51) Int. Cl.
*H01M 4/02* (2006.01)
*H01M 2/08* (2006.01)
(Continued)

(52) U.S. Cl.
CPC .............. *H01M 2/08* (2013.01); *B29C 65/02* (2013.01); *B29C 66/43* (2013.01); *B32B 7/05* (2019.01);
(Continued)

(58) Field of Classification Search
CPC ...................................................... H01M 4/02
See application file for complete search history.

(56) References Cited

U.S. PATENT DOCUMENTS 6,455,202 B1    9/2002  Marugan et al.
2011/0189528 A1  8/2011  Wu et al.
(Continued)

FOREIGN PATENT DOCUMENTS

CN    1497760 A    5/2004
CN    103190015 A    7/2013
(Continued)

OTHER PUBLICATIONS

Minamitani et al., "Thin Power Storage Device and Production Method Thereof", U.S. Appl. No. 14/829,096, filed Aug. 18, 2015.
(Continued)

*Primary Examiner* — Jacob B Marks
(74) *Attorney, Agent, or Firm* — Keating and Bennett, LLP

(57) ABSTRACT

A power storage device includes a positive electrode part including a first metallic foil layer and a positive electrode active material layer partially laminated on one surface of the first metallic foil layer, a negative electrode part including a second metallic foil layer and a negative electrode active material layer partially laminated on one surface of the second metallic foil layer, and a separator arranged between the positive electrode part and the negative electrode part. The positive electrode active material layer is arranged between the first metallic foil layer and the separator, and the negative electrode active material layer is arranged between the second metallic foil layer and the separator. The peripheral regions of the one surfaces of the first and second metallic foil layers in which the positive and negative electrode active material layers are not formed are (Continued)

joined via a peripheral sealing layer containing a thermoplastic resin.

2 Claims, 8 Drawing Sheets

(51) Int. Cl.
  *B32B 7/05* (2019.01)
  *H01M 2/30* (2006.01)
  *H01M 10/04* (2006.01)
  *H01M 10/0585* (2010.01)
  *H01M 10/0587* (2010.01)
  *H01M 6/40* (2006.01)
  *B32B 7/12* (2006.01)
  *B32B 15/18* (2006.01)
  *B32B 15/20* (2006.01)
  *B32B 27/08* (2006.01)
  *B32B 27/30* (2006.01)
  *B32B 27/34* (2006.01)
  *B32B 27/36* (2006.01)
  *B29C 65/02* (2006.01)
  *B29C 65/00* (2006.01)
  *B32B 15/08* (2006.01)
  *B32B 27/06* (2006.01)
  *B32B 37/06* (2006.01)
  *B32B 37/18* (2006.01)
  *H01M 10/0525* (2010.01)
  *B29K 705/00* (2006.01)
  *B29L 31/34* (2006.01)

(52) U.S. Cl.
  CPC ............ *B32B 7/12* (2013.01); *B32B 15/08* (2013.01); *B32B 15/18* (2013.01); *B32B 15/20* (2013.01); *B32B 27/06* (2013.01); *B32B 27/08* (2013.01); *B32B 27/304* (2013.01); *B32B 27/34* (2013.01); *B32B 27/36* (2013.01); *B32B 37/06* (2013.01); *B32B 37/185* (2013.01); *H01M 2/30* (2013.01); *H01M 6/40* (2013.01); *H01M 10/0436* (2013.01); *H01M 10/0585* (2013.01); *H01M 10/0587* (2013.01); *B29K 2705/00* (2013.01); *B29L 2031/3468* (2013.01); *B32B 2307/202* (2013.01); *B32B 2307/206* (2013.01); *B32B 2307/306* (2013.01); *B32B 2307/518* (2013.01); *B32B 2307/714* (2013.01); *B32B 2311/00* (2013.01); *B32B 2311/12* (2013.01); *B32B 2311/22* (2013.01); *B32B 2311/24* (2013.01); *B32B 2311/30* (2013.01); *B32B 2398/00* (2013.01); *B32B 2457/10* (2013.01); *H01M 10/0431* (2013.01); *H01M 10/0525* (2013.01); *H01M 2220/30* (2013.01)

(56) References Cited

U.S. PATENT DOCUMENTS

| | | |
|---|---|---|
| 2013/0149597 A1 | 6/2013 | Suzuta et al. |
| 2013/0209878 A1 | 8/2013 | Nakahara et al. |
| 2014/0072869 A1 | 3/2014 | Hata et al. |
| 2014/0205894 A1 | 7/2014 | Akita et al. |
| 2014/0342225 A1 | 11/2014 | Isshiki et al. |
| 2014/0377624 A1* | 12/2014 | Huang ............ H01M 10/0525 429/121 |

FOREIGN PATENT DOCUMENTS

| | | |
|---|---|---|
| CN | 103296244 A | 9/2013 |
| CN | 102144315 B | 4/2014 |
| CN | 103907226 A | 7/2014 |
| JP | 59-267 U | 1/1984 |
| JP | 2007-073402 A | 3/2007 |
| JP | 2010-508668 A | 3/2010 |
| JP | 2011-077377 A | 4/2011 |
| JP | 2014-032929 A | 2/2014 |
| JP | 5414832 B2 | 2/2014 |
| TW | 201232887 A1 | 8/2012 |
| WO | 2008/053210 A1 | 5/2008 |
| WO | 2013/039131 A1 | 3/2013 |

OTHER PUBLICATIONS

Official Communication issued in Japanese Patent Application No. 2015-137011, dated Jul. 2, 2019.

* cited by examiner

THIN POWER STORAGE DEVICE AND PRODUCTION METHOD THEREOF

BACKGROUND OF THE INVENTION

Field of the Invention

The present disclosure relates to a light-weighted, thinned, and space-saved thin power storage device, and its production method.

In this disclosure, the term "aluminum" is used to express a meaning including Al and Al alloy, the term "copper" is used to express a meaning including Cu and Cu alloy, the term "nickel" is used to express a meaning including Ni and Ni alloy, and the term "titanium" is used to express a meaning including Ti and Ti alloy. Further, in this disclosure, the term "metal" is used to express a meaning including simple metal and alloy.

Description of the Related Art

The following description of related art sets forth the inventors' knowledge of related art and certain problems therein and should not be construed as an admission of knowledge in the prior art.

In recent year, in accordance with the thinning and lightweighting of a mobile device such as, e.g., a smart phone or a tablet terminal, as a packaging material for a lithium-ion secondary battery or a lithium-polymer secondary battery to be mounted on the mobile device, in place of a conventional metallic can, a laminated packaging material in which resin films are adhered on both surfaces of a metallic foil is used. In the same manner, it is being considered to mount an electric condenser, a capacitor, etc., having a laminated packaging material as a backup power source on an IC card or an electronic device.

As a battery in which a battery main body is accommodated in a laminated packaging material in which resin films are adhered on both surfaces of a metallic foil, known is a card battery in which a battery constituent material comprising a laminate of a positive electrode, a separator, and a negative electrode, and electrolyte is accommodated, wherein the card battery is a thin battery using a laminated film which is constituted by sequentially laminating a thermoplastic resin, a metallic foil, and a thermoplastic resin (see Patent Document 1: Japanese Unexamined Patent Application Publication No. 2005-56854)

According to the thin battery disclosed by Patent Document 1, however, the electrode main body and the laminated packaging material are structured separately, and therefore the entire thickness of the power storage device armored by the laminated packaging material is a total of the thickness of the electrode main body and the thickness of the laminated packaging material. For this reason, it was difficult for the thin battery to be applied to an application having a thickness limitation or a weight limitation (an IC card, a smart phone, etc.).

Further, since it is required to provide a tab lead wire (lead wire) extended from an electrode, there is a problem that the number of parts is increased. Further, since the tab lead wire is required to be fixed at a heat-sealed portion formed at the peripheral edge of the laminated packaging material, there is a problem that the number of processes at the time of production increases, resulting in a troublesome work, and that the weight (mass) as a thin battery also increases.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention were made in view of the aforementioned technical background, and aim to provide a light-weighted and thinned thin power storage device and its production method.

To attain the aforementioned objects, some embodiments of the present invention provide the following means.

[1] A thin power storage device comprising:

a positive electrode part including a first metallic foil layer and a positive electrode active material layer laminated on a partial region of one surface of the first metallic foil layer;

a negative electrode part including a second metallic foil layer and a negative electrode active material layer laminated on a partial region of one surface of the second metallic foil layer; and a separator arranged between the positive electrode part and the negative electrode part, wherein the positive electrode active material layer is arranged between the first metallic foil layer and the separator, and the negative electrode active material layer is arranged between the second metallic foil layer and the separator, and wherein a peripheral region of the one surface of the first metallic foil layer of the positive electrode part in which the positive electrode active material layer is not formed and a peripheral region of the one surface of the second metallic foil layer of the negative electrode part in which the negative electrode active material layer is not formed are joined via a peripheral sealing layer containing a thermoplastic resin.

[2] The thin power storage device as recited in the aforementioned Item [1], wherein a first insulation resin film is laminated on the other surface of the first metallic foil layer in a manner such that a first metal exposed portion in which the first metallic foil layer is exposed, and wherein a second insulation resin film is laminated on the other surface of the second metallic foil layer in a manner such that a second metal exposed portion in which the second metallic foil layer is exposed remains.

[3] The thin power storage device as recited in the aforementioned Item [2], wherein the first insulation resin film and the second insulation resin film are each formed by a heat-resistant resin stretched film.

[4] The thin power storage device as recited in any one of the aforementioned Items [1] to [3], wherein the positive electrode active material layer is laminated on the one surface of the first metallic foil layer via a first binder layer, and the negative electrode active material layer is laminated on the one surface of the second metallic foil layer via a second binder layer, and wherein the first binder layer and the second binder layer are each made of at least one binder material selected from the group consisting of polyvinylidene fluoride, styrene-butadiene rubber, carboxymethyl cellulose sodium salt, and polyacrylonitrile.

[5] The thin power storage device as recited in any one of the aforementioned Items [1] to [4], wherein the peripheral sealing layer is formed by a thermoplastic resin unstretched film.

[6] The thin power storage device as recited in any one of the aforementioned Items [1] to [5], wherein an electrolyte is encapsulated between the separator and the positive electrode active material layer, and wherein an electrolyte is encapsulated between the separator and the negative electrode active material layer.

[7] The thin power storage device as recited in any one of the aforementioned Items [1] to [6], wherein the first metallic foil layer is formed by an aluminum foil, and wherein the second metallic foil layer is formed by an aluminum foil, a copper foil, a stainless steel foil, a nickel foil or a titanium foil.

[8] The thin power storage device as recited in any one of the aforementioned Items [1] to [7], wherein a first chemical conversion film is formed at least on a surface of the first metallic foil layer to which the positive electrode active material layer is laminated, and wherein a second chemical conversion film is formed at least on a surface of the second metallic foil layer to which the negative electrode active material layer is laminated.

[9] A production method of a thin power storage device, comprising:

a step of preparing a positive electrode side sheet body including a first metallic foil layer, a positive electrode active material layer laminated on a partial region of one surface of the first metallic foil layer, and a first thermoplastic resin layer provided at a peripheral portion of the one surface of the first metallic foil layer on which the positive electrode active material layer is not formed;

a step of preparing a negative electrode side sheet body including a second metallic foil layer, a negative electrode active material layer laminated on a partial region of one surface of the second metallic foil layer, and a second thermoplastic resin layer provided at a peripheral portion of the one surface of the second metallic foil layer on which the negative electrode active material layer is not formed;

a step of preparing a separator; and a step of heat-sealing the first thermoplastic resin layer of the positive electrode side sheet body and the second thermoplastic resin layer of the negative electrode side sheet body in a state in which the positive electrode side sheet body and the negative electrode side sheet body are in contact with each other via respective thermoplastic resin layers and the separator is sandwiched by and between the positive electrode active material layer and the negative electrode active material layer.

[10] The production method of a thin power storage device as recited in the aforementioned Item [9], wherein the first thermoplastic resin layer is formed by a thermoplastic resin unstretched film and the second thermoplastic resin layer is formed by a thermoplastic resin unstretched film.

In some embodiments of the invention recited in the aforementioned Item [1], the first metallic foil layer constituting the positive electrode part and the second metallic foil layer constituting the negative electrode part also serve a function of a packaging material of the power storage device. In other words, the first and second metallic foil layers serve both functions of an electrode and a packaging material. For this reason, since an additional packaging material is not required to the above structure (a packaging material becomes unnecessary), it becomes possible to attain lightweighting, thinning, and space-saving as a power storage device, and also possible to attain a cost reduction.

In some embodiments of the invention recited in the aforementioned item [2], it is structured such that the first insulation resin film is laminated on the other surface of the first metallic foil layer with the first metal exposed portion through which the first metallic foil layer is exposed remained, and the second insulation resin film is laminated on the other surface of the second metallic foil layer with the second metal exposed portion through which the second metallic foil layer is exposed remained, and these insulation resin films are laminated on both sides of the device. Therefore, sufficient insulation can be secured (except for the metal exposed portions), and physical strength can also be secured. For this reason, it is possible to sufficiently cope with mounting (the thin power storage device) on a portion which is required to have an insulation or a portion having irregularities.

Further, the existence of the first metal exposed portion electrically connected to the positive electrode and the second metal exposed portion electrically connected to the negative electrode enables electric transmission via the metal exposed portions. Thus, there is an advantage that it becomes possible to eliminate a conventional lead wire. For this reason, the number of parts of the thin power storage device can be reduced, and it becomes possible to attain the lightweighting.

Further, a conventional lead wire becomes unnecessary, which prevents an occurrence of a phenomenon of intensively causing heat generation during charging and discharging of the power storage device around the lead wire. Further, the heat generation can be diffused (two-dimensionally) to the entirety of the thin power storage device via the first metallic foil layer constituting the positive electrode part and the second metallic foil layer constituting the negative electrode part. This enables extension of the life of the power storage device (it becomes possible to obtain a long life power storage device). Further, since a lead wire becomes unnecessary, the production cost can be reduced by that.

In addition, like a dry cell battery, it becomes possible to employ a simple mounting method of fitting the thin power storage device into a holder.

According to some embodiments of the invention as recited in the aforementioned Item [3], the first insulation resin film and the second insulation resin film are each formed by a heat-resistant resin stretched film. Therefore, the strength and the formability can be improved.

According to some embodiments of the invention as recited in the aforementioned Item [4], the binder layer made of at least one binder material selected from the group consisting of polyvinylidene fluoride, styrene-butadiene rubber, carboxymethyl cellulose sodium salt, and polyacrylonitrile is provided. The binding property between the first metallic foil layer and the positive electrode active material layer can be improved, and the binding property between the second metallic foil layer and the negative electrode active material layer can also be improved.

According to some embodiments of the invention as recited in the aforementioned Item [5], the peripheral sealing layer is formed by a thermoplastic resin unstretched film, which can improve the chemical resistance (including the resistance against the electrolyte) and also can improve the heat sealing performance of the peripheral sealing layer, which can sufficiently prevent leakage of the electrolyte.

According to some embodiments of the invention as recited in the aforementioned Item [6], it is structured such that an electrolyte is sealed between the separator and the positive electrode active material layer, and the electrolyte is sealed between the separator and the negative electrode active material layer. Although the separator is arranged between them, electric charges can be moved between the positive electrode and the negative electrode via the electrolyte.

According to some embodiments of the invention as recited in the aforementioned Item [7], since the first metallic foil layer is made by an aluminum foil, the application property of the positive electrode active material can be improved, and the lamination of the peripheral sealing layer containing the thermoplastic resin to the first metallic foil layer can be made easy. Further, the second metallic foil layer is formed by an aluminum foil, a copper foil, a stainless steel foil, a nickel foil, or a titanium foil, and therefore the application can be expanded to various power storage devices such as a battery, a capacitor, etc.

According to some embodiments of the invention as recited in the aforementioned Item [8], the corrosion resistance of the first metallic foil layer and the second metallic foil layer can be improved, and the adhesiveness of both the metallic foil layers can be improved.

According to some embodiments of the invention as recited in the aforementioned Item [9], a light-weighted, thinned, and space-saved high quality thin power storage device can be produced efficiently.

According to some embodiments of the invention as recited in the aforementioned Item [10], the first and second thermoplastic resin layers are each formed by a thermoplastic resin unstretched film. Therefore, the chemical resistance (including the resistance against the electrolyte) of the peripheral sealing layer of the thin power storage device can be improved, and the heat sealing performance of the peripheral sealing layer can be improve, which can sufficiently prevent leakage, etc., of the electrolyte.

BRIEF DESCRIPTION OF THE DRAWINGS

The disclosed embodiments of the present invention are shown by way of example, and not limitation, in the accompanying figures.

FIGS. 8A, 8B, and 8C are plan views showing a production method of an embodiment, wherein FIG. 8A is a plan view showing a state in which a positive electrode active material layer is formed at three portions on the surface of the binder layer laminated on one surface of an aluminum foil, FIG. 8B is a plan view showing a cutting position (two-dot chain line) for obtaining a positive electrode side sheet body, and FIG. 8C is a plan view showing three cut pieces in an arranged manner.

FIGS. 9A and 9B are views showing one embodiment of a power storage module according to the present invention, wherein FIG. 9A is a perspective view seen from the front side, and FIG. 9B is a perspective view seen from the rear side.

FIGS. 10A, 10B, and 10C are plan views showing a production method according to Comparative Example 1, wherein FIG. 10A is a perspective view showing a state in which a separator is sandwiched by a positive electrode and a negative electrode, FIG. 10B is a perspective view showing a state in which a battery main body is sandwiched from both sides thereof by packaging materials, and FIG. 10C is a perspective view showing a thin power storage device of Comparative Example 1 obtained by heat-sealing the peripheral edges of a pair of packaging materials.

EMBODIMENTS FOR CARRYING OUT THE INVENTION

In the following paragraphs, some embodiments of the invention will be described by way of example and not limitation. It should be understood based on this disclosure that various other modifications can be made by those in the art based on these illustrated embodiments.

Figure 1:
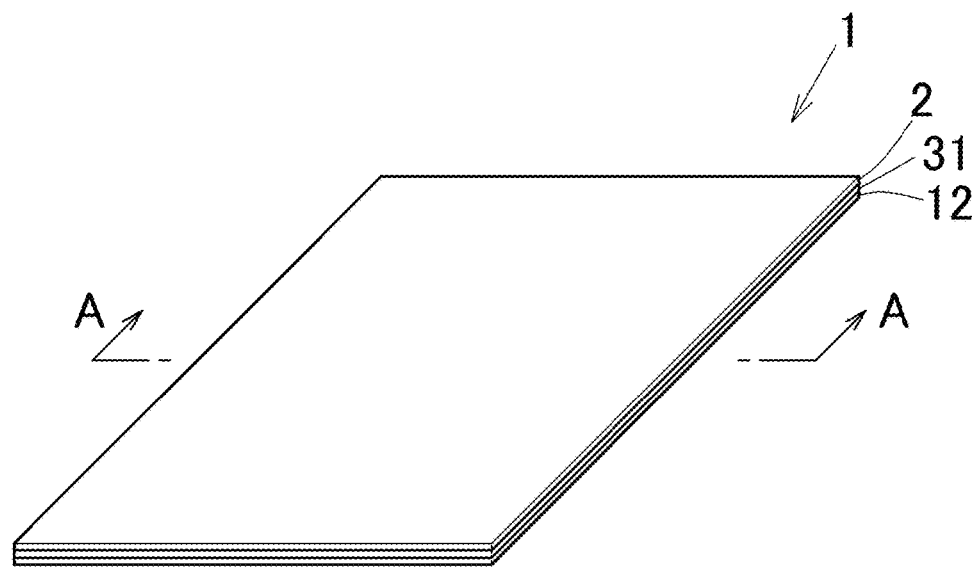
FIG. 1 is a perspective view showing one embodiment of a thin power storage device according to the present invention.
Figure 2:
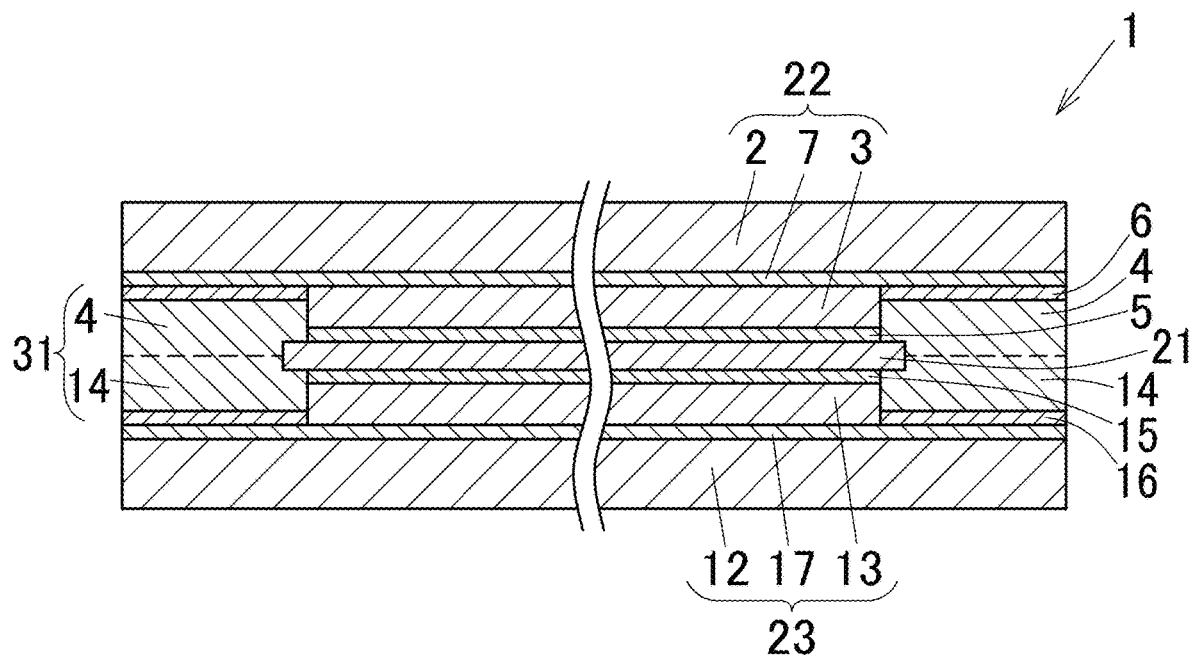
FIG. 2 is an enlarged cross-sectional view taken along the line A-A in FIG. 1.

A first embodiment of a thin power storage device according to the present invention is shown in FIGS. 1 and 2. This thin power storage device 1 is equipped with a positive electrode part 22, a negative electrode part 23, and a separator 21 (see FIG. 2). The separator 21 is arranged between the positive electrode part 22 and the negative electrode part 23.

The positive electrode part 22 includes a first metallic foil layer 2 and a positive electrode active material layer 3 laminated on a partial region of one surface (separator side surface) of the first metallic foil layer 2. In this embodiment, the positive electrode active material layer 3 is laminated on the central portion (region excluding the peripheral portion) of one surface (separator side surface) of the first metallic foil layer 2. Further, in this embodiment, a binder layer 7 is laminated on the entire surface of the one surface of the first metallic foil layer 2. That is, in this embodiment, the positive electrode active material layer 3 is laminated on the one surface (separator side surface) of the first metallic foil layer 2 via the binder layer 7.

The negative electrode part 23 includes a second metallic foil layer 12 and a negative electrode active material layer 13 laminated on a partial region of one surface (separator side surface) of the second metallic foil layer 12. In this embodiment, the negative electrode active material layer 13 is laminated on the central portion (region excluding the peripheral portion) of one surface (separator side surface) of the second metallic foil layer 12. Further, in this embodiment, a binder layer 17 is laminated on the entire surface of the one surface (separator side surface) of the second metallic foil layer 12. That is, in this embodiment, the negative electrode active material layer 13 is laminated on the one surface (separator side surface) of the second metallic foil layer 12 via the binder layer 17.

The positive electrode active material layer 3 is arranged between the first metallic foil layer 2 and the separator 21, and the negative electrode active material layer 13 is arranged between the second metallic foil layer 12 and the separator 21 (see FIG. 2).

At the peripheral portion of the one surface (separator 21 side surface) of the first metallic foil layer 2 of the positive electrode part 22, there exists a region on which the positive electrode active material layer is not formed. While, at the peripheral portion of the one surface (separator 21 side surface) of the second metallic foil layer 12 of the negative electrode part 23, there exists a region on which the negative electrode active material layer is not formed. Thus, a peripheral region of the one surface of the first metallic foil layer 2 of the positive electrode part 22 on which the positive electrode active material layer is not formed and a peripheral region of the one surface of the second metallic foil layer 12 of the negative electrode part 23 on which the negative electrode active material layer is not formed are joined and sealed via a peripheral sealing layer 31 containing a thermoplastic resin (see FIG. 2). The peripheral portion of the separator 21 is entered into and engaged with the intermediate portion of the inner peripheral surface of the peripheral sealing layer 31 in the height direction (thickness direction) (see FIG. 2).

In this embodiment, at the peripheral region of the binder layer 7 laminated on the one surface of the first metallic foil layer 2 of the positive electrode part 22 on which the positive electrode active material layer is not formed, a first peripheral adhesive agent layer 6 is laminated. At the peripheral region of the binder layer 17 laminated on the one surface of the second metallic foil layer 12 of the negative electrode part 23 on which the negative electrode active material layer is not formed, a second peripheral adhesive agent layer 16 is laminated. A structure is adopted in which both the adhesive agent layers 6 and 16 are joined and sealed vial the peripheral sealing layer 31 (see FIG. 2).

An electrolyte 5 is encapsulated between the separator 21 and the positive electrode active material layer 3. Further, an electrolyte 15 is encapsulated between the separator 21 and the negative electrode active material layer 13 (see FIG. 2). The peripheral region of the first metallic foil layer 2 on which the positive electrode active material layer is not formed and the peripheral region of the second metallic foil layer 12 on which the negative electrode active material layer is not formed are joined and sealed via the peripheral sealing layer 31. Therefore, leakages of the electrolytes 5 and 15 can be prevented. That is, within the sealed space surrounded by the peripheral sealing layer 31, the first peripheral adhesive agent layer 6 and the second peripheral adhesive agent layer 16 between the binder layer 7 arranged at the inner side of the first metallic foil layer 2 and the binder layer 17 arranged at the inner surface side of the second metallic foil layer 12, in the order from the first metallic foil layer 2 side, the positive electrode active material layer 3, the electrolyte 5, the separator 21, the electrolyte 15, and the negative electrode active material layer 13 are arranged and sealed (see FIG. 2).

In the thin power storage device 1 having the aforementioned structure, the first metallic foil layer 2 structuring the positive electrode part 22 and the second metallic foil layer 12 structuring the negative electrode part 23 also serve a function as a packaging material of the power storage device. That is, the first and second metallic foil layers serve both functions of an electrode and a packaging material. For this reason, since a packaging material is not required in addition to the aforementioned structure (a packaging material becomes unnecessary), as a thin power storage device, it becomes possible to attain lightweighting, thinning, and space-saving, and also becomes possible to attain a cost reduction.

Figure 3:
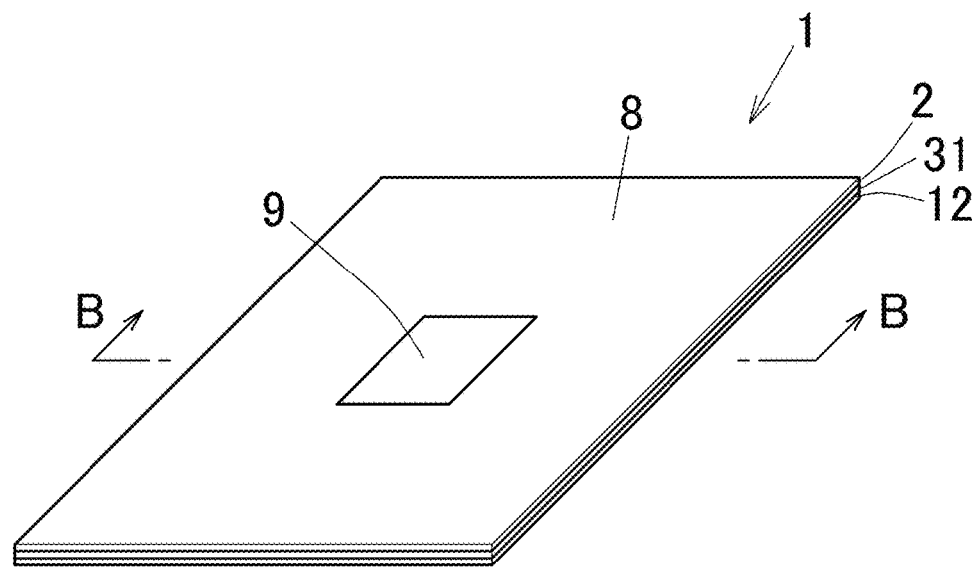
FIG. 3 is a perspective view showing another embodiment of a thin power storage device according to the present invention.
Figure 4:
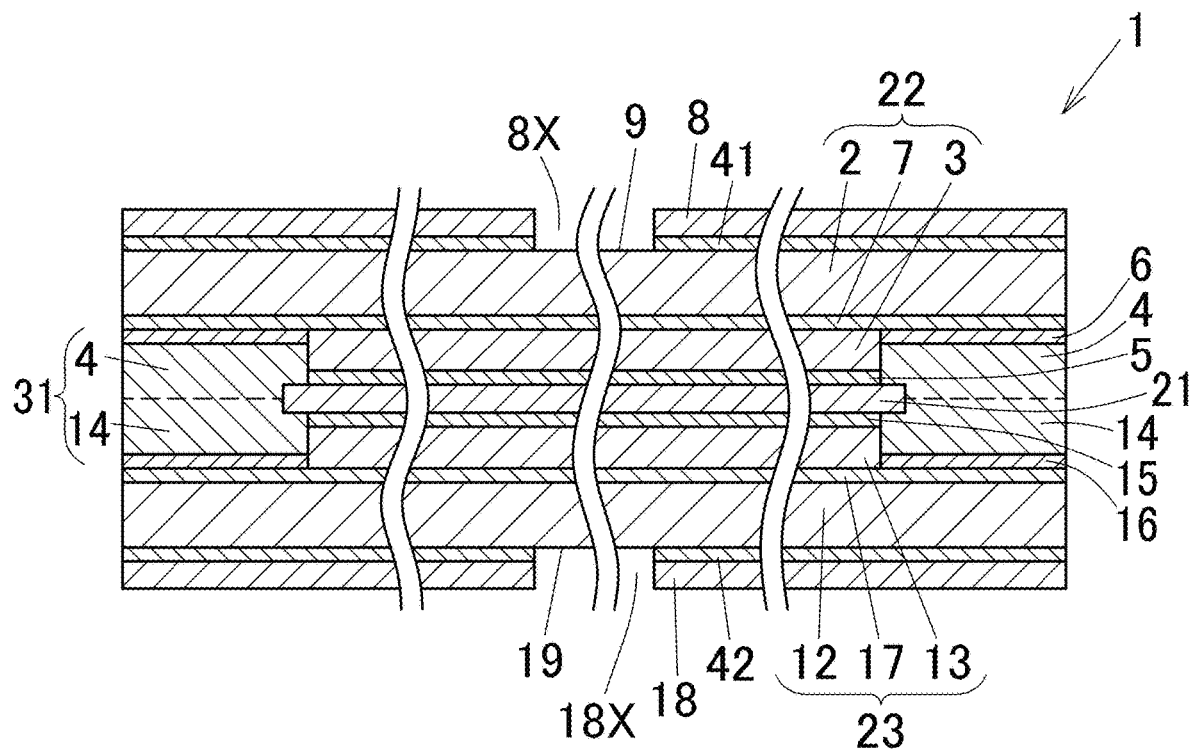
FIG. 4 is an enlarged cross-sectional view taken along the line B-B in FIG. 3.

A second embodiment (preferred embodiment) of a thin power storage device according to the present invention is shown in FIGS. 3 and 4. This thin power storage device 1 has the structure of the aforementioned first embodiment, and further has the following structure.

That is, in a manner such that a first metal exposed portion 9 in which the first metallic foil layer 2 is exposed remains, the first insulation resin film 8 is laminated on the other surface (the surface opposite to the separator side surface) of the first metallic foil layer 2, and that a second metal exposed portion 19 in which the second metallic foil layer 12 is exposed remains, the second insulation resin film 18 is laminated on the other surface (the surface opposite to the separator side surface) of the second metallic foil layer 12. In this embodiment, in a manner such that the first metal exposed portion 9 through which the first metallic foil layer is exposed remains, the first insulation resin film 8 is laminated on the other surface (the surface opposite to the separator side surface) of the first metallic foil layer 2 via a third adhesive agent layer 41. Further, in a manner such that the second metal exposed portion 19 through which the second metallic foil layer 12 is exposed remains, the second insulation resin film 18 is laminated on the other surface (the surface opposite to the separator side surface) of the second metallic foil layer 12 via a fourth adhesive agent layer 42. Further, in this embodiment, the first metal exposed portion 9 is provided at the central region of the other surface of the first metallic foil layer 2, and the second metal exposed portion 19 is provided at the central region of the other surface of the second metallic foil layer 12 (see FIGS. 3 and 4).

In the thin power storage device 1 of this second embodiment, in the same manner as in the first embodiment, the first and second metallic foil layers serve both functions of an electrode and a packaging material. For this reason, a packaging material is not required in addition to the structure (that is, a packaging material becomes unnecessary). As a result, as a thin power storage device, it becomes possible to attain lightweighting, thinning, and space-saving, and also becomes possible to attain a cost reduction.

Further, since the insulation resin films 8 and 18 are laminated on both sides of the device, sufficient insulation can be secured (except for the metal exposed portions), and sufficient physical strength can also be secured. Therefore, it is sufficiently possible to mount the thin power storage device 1 of the present invention on a portion requiring insulation properties and/or a portion with irregularities.

Further, the existence of the first metal exposed portion 9 electrically connected to the positive electrode and the second metal exposed portion 19 electrically connected to the negative electrode enables electric transmission via the metal exposed portions 9 and 19. Therefore, there is an advantage that it becomes possible to eliminate the necessity (the use) of a conventional lead wire (e.g., tab leads 131 and 141 shown in FIGS. 10A, 10B, and 10C, etc.). For this reason, the number of parts of the thin power storage device can be reduced, and it becomes possible to attain the lightweighting.

Further, a conventional lead wire becomes unnecessary, which prevents a phenomenon that heat generation during charging and discharging of the power storage device intensively occurs around the lead wire. Further, heat generation can be diffused to the entirety of both surfaces of the thin power storage device 1 via the first metallic foil layer 2 constituting the positive electrode part 22 and the second metallic foil layer 12 constituting the negative electrode part 23. This enables an extension of the life of the power storage device 1 (that is, a long life power storage device can be obtained). Further, since a lead wire becomes unnecessary, the production cost can be reduced by that.

In addition, like a dry cell battery, it becomes possible to employ a simple mounting method of fitting the thin power storage device 1 of the present invention into a holder.

In the present invention, the first metallic foil layer 2 is not especially limited, but is preferably made of an aluminum foil. The thickness of the first metallic foil layer 2 is preferably set to 7 μm to 150 μm. Especially, in the case of being used as a thin lithium secondary battery, the first metallic foil layer 2 is preferably made of a hard aluminum foil having a thickness of 7 μm to 50 μm.

The positive electrode active material layer 3 is not specifically limited, but can be formed by, e.g., a mixed composition in which salt (such as, e.g., lithium cobalt oxide, lithium nickel oxide, lithium iron phosphate, lithium manganese oxide, etc.) is added to a binder, such as, e.g., polyvinylidene fluoride (PVDF), styrene-butadiene rubber (SBR), carboxymethyl cellulose sodium salt (CMC), polyacrylonitrile (PAN), etc. The thickness of the positive electrode active material layer 3 is preferably set to 2 μm to 300 μm.

The positive electrode active material layer 3 may further includes a conductive assistant such as, e.g., carbon black, carbon nanotube (CNT), etc.

The binder layer 7 is not specifically limited, but can be, for example, a layer formed by polyvinylidene fluoride (PVDF), styrene-butadiene rubber (SBR), carboxymethyl cellulose sodium salt (CMC), polyacrylonitrile (PAN), etc., which can be formed by applying it to the one surface (separator 21 side surface) of the first metallic foil layer 2.

The binder layer 7 may further include a conductive assistant such as, e.g., carbon black, carbon nanotube (CNT), etc., to improve the electrical conductivity between the first metallic foil layer 2 and the positive electrode active material layer 3.

The thickness of the binder layer 7 is preferably set to 0.2 μm to 10 μm. By setting to 10 μm or less, it becomes possible to control the increase of the internal resistance of the power storage device 1 as much as possible.

The binder layer 7 is not required to be provided, but is preferably provided between the first metallic foil layer 2 and the positive electrode active material layer 3 to improve the binding property between the first metallic foil layer 2 and the positive electrode active material layer 3.

The first peripheral adhesive agent layer 6 is not specifically limited, but can be exemplified by an adhesive layer formed by a polyurethane-based adhesive agent, an acrylic adhesive agent, an epoxy-based adhesive agent, a polyolefin-based adhesive agent, an elastomeric adhesive agent, a fluorine-based adhesive agent, etc. Among them, it is preferable to use an acrylic adhesive agent, or a polyolefin-based adhesive agent. In this case, the electrolyte resistance and the water vapor barrier property can be improved. Further, it is especially preferable that the first peripheral adhesive agent layer 6 is a layer formed by a two-part curing type olefin-based adhesive agent. In the case of using a two-part curing type olefin-based adhesive, the possible deterioration of the adhesiveness due to the swelling of the electrolyte can be prevented sufficiently. In cases where the power storage device 1 constitutes a battery, the first peripheral adhesive agent layer 6 is preferably made of an acid-modified polypropylene adhesive agent, or an acid-modified polyethylene adhesive agent. The thickness of the first peripheral adhesive agent layer 6 is preferably set to 0.5 μm to 5 μm.

In the present invention, the second metallic foil layer 12 is not especially limited, but is preferably made by an aluminum foil, a copper foil, a stainless steel foil, a nickel foil, or a titanium foil. The thickness of the second metallic foil layer 12 is preferably set to 7 μm to 50 μm.

The negative electrode active material layer 13 is not specifically limited, but can be formed by, e.g., a mixed composition in which an additive (such as, e.g., graphite, lithium titanium acid, Si-based alloy, tin-based alloy, etc.) is added to a binder, such as, e.g., polyvinylidene fluoride (PVDF), styrene-butadiene rubber (SBR), carboxymethyl cellulose sodium salt (CMC), polyacrylonitrile (PAN), etc. The thickness of the negative electrode active material layer 13 is preferably set to 1 μm to 300 μm.

The negative electrode active material layer 13 may further include a conductive assistant such as carbon black, carbon nanotube (CNT), etc.

In the case of forming the negative electrode active material layer 13 or the positive electrode active material layer 3 by applying the active material, by applying the active material with the non-active material applying portion (peripheral portion, etc.) being previously masked by a masking tape, an active material layer can be formed without adhering the active material on the non-active material applying portion (peripheral portion, etc.). As a masking tape, a tape on which an adhesive is applied to a film such as, e.g., a polyester resin film, a polyethylene resin film, a polypropylene resin film, etc., can be used.

The binder layer 17 is not specifically limited, but can be, for example, a layer formed by polyvinylidene fluoride (PVDF), styrene-butadiene rubber (SBR), carboxymethyl cellulose sodium salt (CMC), polyacrylonitrile (PAN), etc., which can be formed by, for example, applying it to the one surface (separator side surface) of the second metallic foil layer 12.

The binder layer 17 may further include a conductive assistant such as, e.g., carbon black, carbon nanotube (CNT), etc., to improve the electrical conductivity between the second metallic foil layer 12 and the negative electrode active material layer 13.

The thickness of the binder layer 17 is preferably set to 0.2 μm to 10 μm. By setting to 10 μm or less, it becomes possible to control that the binder itself increases the internal resistance of the power storage device 1 as much as possible.

The binder layer 17 is not required to be provided, but is preferably provided between the second metallic foil layer 12 and the negative electrode active material layer 13 to improve the binding property between the second metallic foil layer 12 and the negative electrode active material layer 13.

The second peripheral adhesive agent layer 16 is not specifically limited, but can be exemplified by an adhesive layer formed by, for example, a polyurethane-based adhesive agent, an acrylic adhesive agent, an epoxy-based adhesive agent, a polyolefin-based adhesive agent, an elastomeric adhesive agent, a fluorine-based adhesive agent, etc. Among them, it is preferable to use an acrylic adhesive agent, or a polyolefin-based adhesive agent. In this case, the electrolyte resistance and the water vapor barrier property can be improved. Further, it is especially preferable that the second peripheral adhesive agent layer 16 is a layer formed by a two-part curing type olefin-based adhesive agent. In the case of using a two-part curing type olefin-based adhesive agent, the possible deterioration of the adhesiveness due to the swelling of the electrolyte can be sufficiently prevented. In cases where the power storage device 1 constitutes a battery, the second peripheral adhesive agent layer 16 is preferably made of an acid-modified polypropylene adhesive agent, or an acid-modified polyethylene adhesive agent. The thickness of the second peripheral adhesive agent layer 16 is preferably set to 0.5 µm to 5 µm.

In the aforementioned embodiment, the peripheral sealing layer 31 (the peripheral sealing layer containing a thermoplastic resin) is formed by overlapping the first thermoplastic resin layer 4 laminated on the peripheral portion of one surface of the first metallic foil layer 2 and the second thermoplastic resin layer 14 laminated on the peripheral portion of one surface of the second metallic foil layer 12 and fusion-welding them by heat. As the first thermoplastic resin layer 4, it is preferable to use a layer formed by a thermoplastic resin unstretched film. Further, as the second thermoplastic resin layer 14, it is preferable to use a layer formed by a thermoplastic resin unstretched film.

The thermoplastic resin unstretched films 4 and 14 is not specifically limited, but is preferably structured by an unstretched film made of at least one type of a thermoplastic resin selected from the group consisting of polyethylene, polypropylene, olefin copolymer, their acid-modified product and ionomer.

The thickness of the thermoplastic resin unstretched films 4 and 14 is preferably set to 20 µm to 150 µm.

The separator 21 is not specifically limited, but can be exemplified by: for example, a polyethylene separator;

a polypropylene separator;

a separator formed by a multi-layer film made of a polyethylene film and a polypropylene film; and a separator structured by a wet or dry porous film on which a heat-resistant inorganic substance such as ceramic is applied to one of the aforementioned separator.

The thickness of the separator 21 is preferably set to 5 µm to 50 µm.

As the electrolytes 5 and 15, it is not specifically limited. However, it is preferable to use a mixed non-aqueous electrolyte containing at least two types of electrolytes selected from the group consisting of ethylene carbonate, propylene carbonate, dimethyl carbonate, ethyl methyl carbonate, diethyl carbonate and dimethoxyethane, and lithium salt. As the lithium salt, it is not specifically limited, but can be exemplified by, for example, lithium hexafluorophosphate, lithium tetrafluoroborate or the like. As the electrolytes 5 and 15, it is possible to use an electrolyte in which the aforementioned mixed non-aqueous electrolyte is gelled with polyvinylidene fluoride (PVDF), polyethylene oxide (PEO), etc.

The separator 21 and the electrolytes 5 and 15 are encapsulated in a sealed manner in the space between the first metallic foil layer 2 and the second metallic foil layer 12 in such a manner that the periphery is surrounded by the peripheral sealing layer 31, etc. (see FIGS. 2 and 4). This prevents leakage of the electrolytes.

As the first insulation resin film 8 and the second insulation resin film 18, it is not specifically limited, but is preferable to use a stretched polyamide film (a stretched nylon film, etc.) or a stretched polyester film. Among them, it is especially preferable to use a biaxially stretched polyamide film (biaxially stretched nylon film or the like), a biaxially stretched polybutylene terephthalate (PBT) film, a biaxially stretched polyethylene terephthalate (PET) film or a biaxially stretched polyethylene naphthalate (PEN) film.

The first insulation resin film 8 and the second insulation resin film 18 can be formed by a single layer, or can be formed by a multi-layer made of, for example, a stretched polyester film/a stretched polyamide film (a multi-layer made of a stretched PET film/a stretched nylon film, etc.).

In the first insulation resin film 8, an opening 8X for securing the first metal exposed portion 9 is partially formed (see FIG. 4). In this embodiment, the opening 8 X is provided at the central portion of the first insulation resin film 8, but the position is not limited to the above. The plan view shape of the opening 8X is not limited to a rectangular shape.

In the same manner, in the second insulation resin film 18, an opening 18X for securing the second metal exposed portion 19 is partially provided (see FIG. 4). In this embodiment, the opening 18X is provided at the central portion of the second insulation resin film 18, but the position is not limited to the above. The plan view shape of the opening 18X is not limited to a rectangular shape.

The thickness of the first insulation resin film 8 and the thickness of the second insulation resin film 18 are each preferably set to 0.02 mm to 0.1 mm.

In the case of providing the third adhesive agent layer 41 and the fourth adhesive agent layer 42, as these adhesive agents 41 and 42, it is no specifically limited, but it is preferable to use at least one type of an adhesive agent selected from the group consisting of a polyester urethane-based adhesive agent and a polyether urethane-based adhesive agent. As the polyester urethane-based adhesive agent, for example, a two-part curing type polyester urethane-based resin adhesive agent containing a polyester resin as a main agent and a polyfunctional isocyanate compound as a curing agent is exemplified. As the polyether urethane-based adhesive agent, for example, a two-part curing type polyether urethane-based resin adhesive agent containing a polyether resin as a main agent and a polyfunctional isocyanate compound as a curing agent is exemplified. The thickness of the third adhesive agent layer 41 and the thickness of the fourth adhesive agent layer 42 are each preferably set to 0.5 µm to 5 µm. It is preferred that the third adhesive agent 41 is applied to the other surface of the first metallic foil layer 2 (the surface opposite to the separator side) and then the first insulation resin film 8 is adhered thereto and integrally bonded with each other. Further, it is preferred that the fourth adhesive agent 42 is applied to the other surface of the second metallic foil layer 12 (the surface opposite to the separator side) and then the second insulation resin film 18 is adhered thereto and integrally bonded with each other.

Since the adhesive agent non-applied portions of the third adhesive agent layer 41 and the fourth adhesive agent layer 42 (regions corresponding to the openings 8X and 18X) look different in glossiness from the adhesive agent applied region even observed through the insulation resin film (heat-resistant resin stretched film, etc.), the position and the shape of the adhesive agent non-applied portion can be distinguished from the outside even in a state in which an insulation resin film with no opening is adhered thereon. Thus, by removing the portion of the adhered insulation resin film corresponding to the adhesive agent non-applied portion to thereby form the openings 8X and 18X, it becomes possible to form a structure in which the metal exposed portions 9 and 19 are exposed. For example, by irradiating a laser to the periphery of the adhesive agent non-applied portion of the adhered insulation resin film to thereby cut the part of the insulation resin film corresponding to the adhesive agent non-applied portion to form the openings 8X and 18X, it becomes possible to form a structure in which the metal exposed portions 9 and 19 are exposed.

Further, in the third adhesive agent layer 41 and the fourth adhesive agent layer 42, a coloring agent such as an organic pigment, an inorganic pigment, a coloring matter, etc., can be added to the aforementioned adhesive agent in a range of 0.1 parts by mass to 5 parts by mass with respect to the resin component 100 parts by mass. As the organic pigment, it is not specifically limited, but, for example, an azo pigment such as lake red, naphthols, hansa yellow, disazo yellow, benzimidazolone, etc., a polycyclic pigment such as quinophthalone, isoindoline, pyrrolo-pyrrole, dioxazine, phthalocyanine blue, phthalocyanine green, etc., a lake pigment such as lake red C, watching red, etc., can be exemplified. Further, as the aforementioned inorganic pigment, it is not specifically limited, but, for example, carbon black, oxide titanium, calcium carbonate, kaolin, iron oxide, zinc oxide, etc., can be exemplified. Further, as the aforementioned coloring matter, it is not specifically limited, but, for example, yellow dyes such as trisodium salt (Yellow No. 4), etc., red dyes such as disodium salt (Red No. 3), etc., blue dyes such as disodium salt (Blue No. 1), etc., can be exemplified.

Further, regardless of the presence or absence of the addition of coloring agents, by adhering a transparent insulation resin film (heat-resistant resin stretched film, etc.), it becomes possible to readily discriminate the adhesive agent non-applied portion. By structuring such that the coloring agent is added to the adhesive agent of the third adhesive agent layer 41 and the fourth adhesive agent layer 42 and adhering a transparent insulation resin film (heat-resistant resin stretched film, etc.), it becomes extremely easy to discriminate the adhesive agent non-applied portion.

In the present invention, it is preferable that a chemical conversion film is formed at least on the surface of the first metallic foil layer 2 to which the positive electrode active material layer 3 is laminated. Further, in the same manner, it is preferable that a chemical conversion film is formed at least on the surface of the second metallic foil layer 12 to which the negative electrode active material layer 13 is laminated. The chemical conversion film is a film which is formed by subjecting a surface of a metallic foil to a chemical conversion treatment, and such a chemical conversion treatment sufficiently prevents corrosion of the metallic foil surface due to contents (electrolyte, etc.).

For example, the following treatments are executed to subject the metallic foil to a chemical conversion treatment. Any one of the following aqueous solutions 1) to 3) is applied to the degreased surface of the metallic foil and then dried to thereby execute a chemical conversion treatment.
1) an aqueous solution of a mixture containing:
   phosphoric acid;
   chromic acid; and
   at least one compound selected from the group consisting of metal salt of fluoride and nonmetal salt of fluoride
2) an aqueous solution of a mixture containing:
   phosphoric acid;
   at least one resin selected from the group consisting of acrylic resin, chitosan derivative resin and phenolic resin; and
   at least one compound selected from the group consisting of chromic acid and chromium (III) salt.
3) an aqueous solution of a mixture containing:
   phosphoric acid;
   at least one resin selected from the group consisting of acrylic resin, chitosan derivative resin and phenolic resin;
   at least one compound selected from the group consisting of chromic acid and chromium (III) salt; and
   at least one compound selected from the group consisting of metal salt of fluoride and nonmetal salt of fluoride.

The chemical conversion film is preferable that the chromium deposition amount (per one side) is 0.1 mg/m$^2$ to 50 mg/m$^2$, more specifically 2 mg/m$^2$ to 20 mg/m$^2$.

Next, a preferred structure of the thin power storage device in the case of using the thin power storage device 1 of the present invention as an electric double layer capacitor will be explained, but it should be noted that the explanation is merely directed to a preferred structure and the present invention is not limited to the exemplified structure.

That is, in the case of being used as an electric double layer capacitor, the first metallic foil layer 2 and the second metallic foil layer 12 are each preferably made of a hard aluminum foil having a thickness of 7 μm to 50 μm.

The positive electrode active material layer 3 and the negative electrode active material layer 13 are not specifically limited, but it is preferred to contain a conductive agent such as carbon black, carbon nanotube (CNT), etc.

As the separator 21, it is not specifically limited, but a porous poly cellulose membrane having a thickness of 5 μm to 100 μm, a nonwoven fabric having a thickness of 5 μm to 100 μm, etc., can be preferably used.

As the electrolytes 5 and 15, it is not specifically limited, but is preferred to use an electrolyte containing water, at least one organic solvent selected from the group consisting of ethylene carbonate, propylene carbonate, dimethyl carbonate, ethyl methyl carbonate and acetonitrile, and at least one salt selected from the group consisting of lithium hexafluorophosphate, lithium tetrafluoroboric acid and tetrafluoroborate quaternary ammonium salt. As the quaternary ammonium salt, for example, tetramethyl ammonium salt can be exemplified.

The preferred structure of the thin power storage device of the present invention in the case of being used as an electric double layer capacitor was explained above. The followings are explanations, including an explanation directed to all other applications other than an electric double layer capacitor.

The thin power storage device 1 of the present invention is normally set to 0.08 mm to 0.3 mm in thickness. Among them, the thickness of the thin power storage device 1 is preferably set to 0.1 mm to 0.2 mm.

Next, a power storage device module structured using a thin power storage device 1 of the present invention will be explained. One embodiment of the power storage device module 50 is shown in FIGS. 5 and 6.

Figure 5:
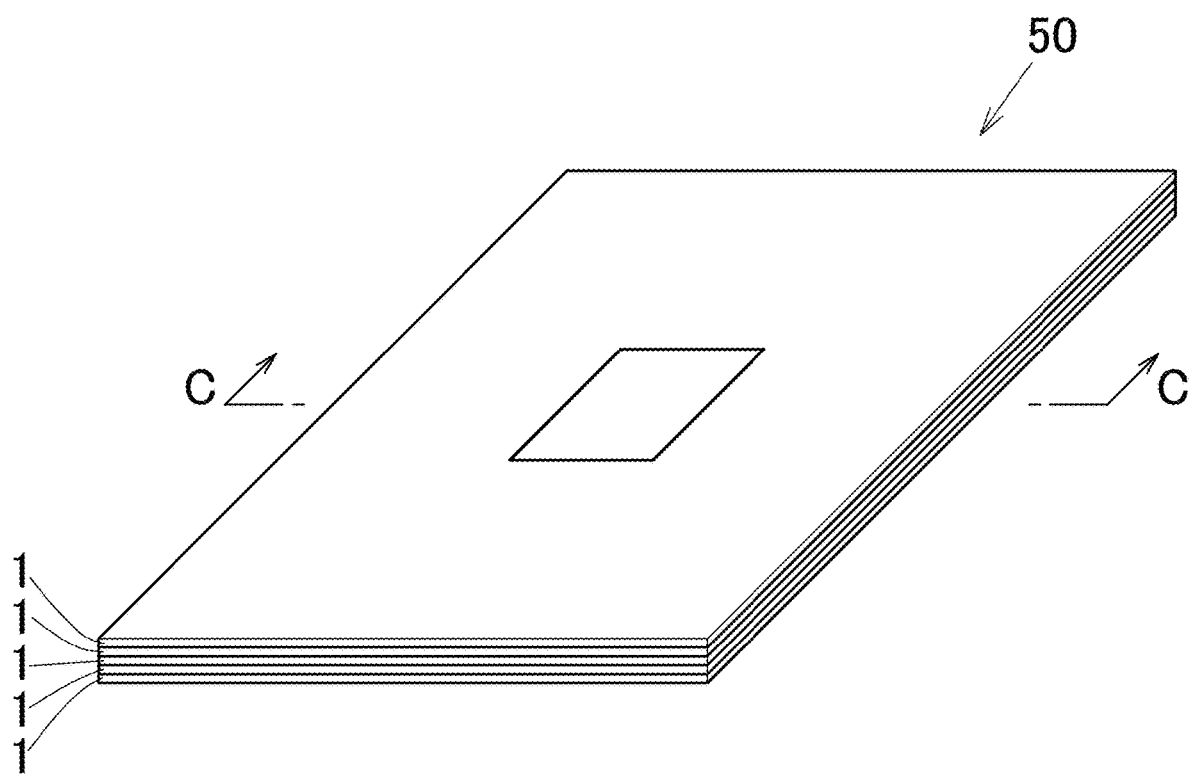
FIG. 5 is a perspective view showing one embodiment of a power storage device module constituted by a plurality of thin power storage devices according to the present invention.
Figure 6:
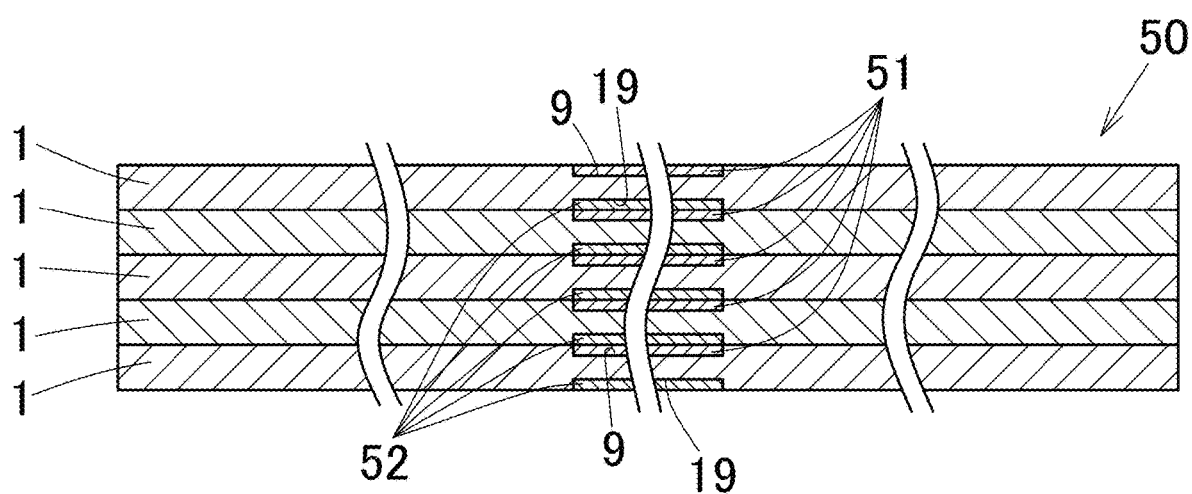
FIG. 6 is an enlarged cross-sectional view taken along the line C-C in FIG. 5.

The power storage device module 50 has a structure in which a plurality of thin power storage devices 1 of the present invention are laminated (stacked and overlapped) in a thickness direction (see FIGS. 5 and 6). In the power storage device module 50 of this embodiment, a conductive resin is applied to the first metal exposed portion 9 and the second metal exposed portion 19 of each thin power storage device 1. That is, in each thin power storage device, the positive electrode side conductive layer 51 containing a conductive resin is formed on the surface of the first metal exposed portion 9, and the negative electrode side conductive layer 52 containing a conductive resin is formed on the surface of the second metal exposed portion 19 (see FIG. 6). Thus, according to the power storage device module 50, in the adjacent thin power storage devices 1, the positive electrode side conductive layer 51 of one power storage device 1 and the negative electrode side conductive layer 52 of the other power storage device 1 are in well-contact with each other, structuring a series connection of a plurality of thin power storage devices 1 (see FIG. 6). As the conductive resin, it is not specifically limited, but for example, a resin containing carbon can be exemplified.

In the aforementioned embodiment, it is structured that a conductive resin is applied to the metal exposed portions 9 and 19. However, the present invention is not specifically limited to such a structure, and allows the structure that a plurality of metallic foils (aluminum foils, stainless steel foils, copper foils, nickel foils, etc.) having a thickness of 100 µm or less are laminated. That is, it can be structured that the positive electrode side conductive layer 51 made of a metallic foil is formed on the surface of the first metal exposed portion 9, and the negative electrode side conductive layer 52 made of a metallic foil is formed on the surface of the second metal exposed portion 19.

Since the positive electrode side conductive layer 51 and the negative electrode side conductive layer 52 are provided as explained above, there is an advantage that a sufficient electrical conduction state between adjacent power storage devices 1 can be secured by simply arranging them in a laminated manner.

Alternatively, without providing such conductive layers 51 and 52, in thin power storage devices 1 adjacent to each other in a thickness direction, it can be structured such that a plurality of thin power storage devices 1 are connected in series with the first metal exposed portion 9 of one of the power storage devices 1 and the second metal exposed portion 19 of the other power storage device 1 being connected. When the thickness of the insulation resin film layers 8 and 18 is small, a sufficient electrical conduction state can be secured between the adjacent power storage devices 1 even without providing the positive electrode side conductive layer 51 and the negative electrode side conductive layer 52.

Next, a power storage device module 50 (see FIGS. 5 and 6) in which a plurality of thin power storage devices 1 of the present invention are laminated in the thickness direction will be explained.

The power storage device module 50 has a structure in which a plurality of thin power storage devices 1 are laminated, and therefore the module can be deformed. For example, it is possible to make the power storage device module 50 into a cylindrical shape by bending it, and also possible to make the power storage device module 50 into a cylindrical shape by more compactly bending it so as to be wound in plural times. It is also possible to adopt a configuration described below (see FIGS. 9A and 9B) by taking advantage of such characteristics of the power storage device module 50.

Figure 9A:
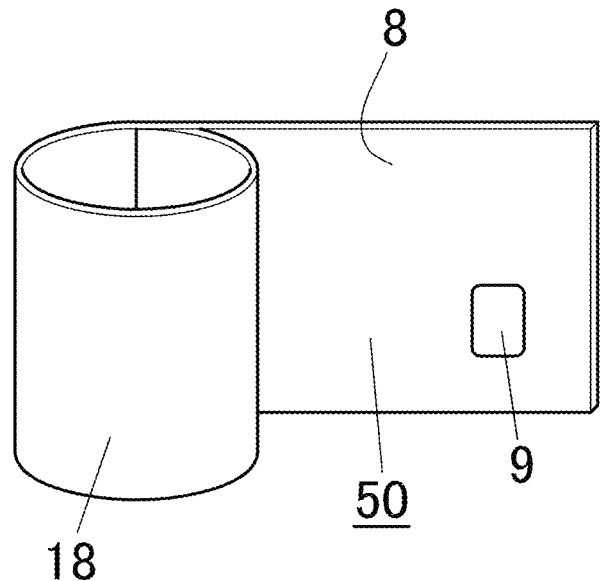
Figure 9B:
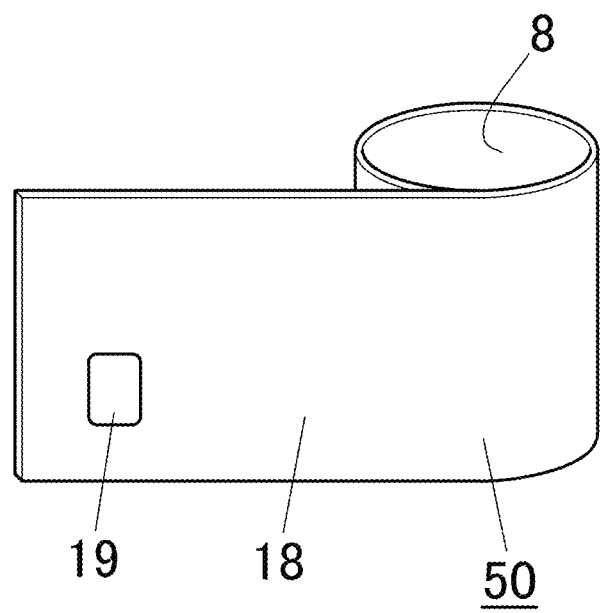

In FIGS. 9A and 9B, the power storage device 1 is formed into a long rectangular shape, and the first metal exposed portion 9 and the second metal exposed portion 19 are provided at the longitudinal end portion of the power storage device 1. Other structures are the same as those of the power storage device shown in FIGS. 5 and 6. In FIGS. 9A and 9B, the power storage device module 50 in which a plurality of thin power storage devices 1 are laminated in the thickness direction are wound and formed into a cylindrical shape. Since the first metal exposed portion 9 and the second metal exposed portion 19 are provided at the longitudinal end portion of the power storage device 1, it is easy to attain a connection to a terminal (positive electrode side connection terminal, negative electrode side connection terminal) of an equipment (an electronic cigarette, a penlight, etc.). Further, since the external surfaces of the module 50 are formed by the insulation resin films 8 and 18, sufficient insulation properties can be secured.

Next, one example of a production method of the thin power storage device 1 according to the present invention will be explained. Initially, the positive electrode side sheet body 61, the negative electrode side sheet body 62, and the separator 21 are prepared (see FIG. 7).

Figure 7:
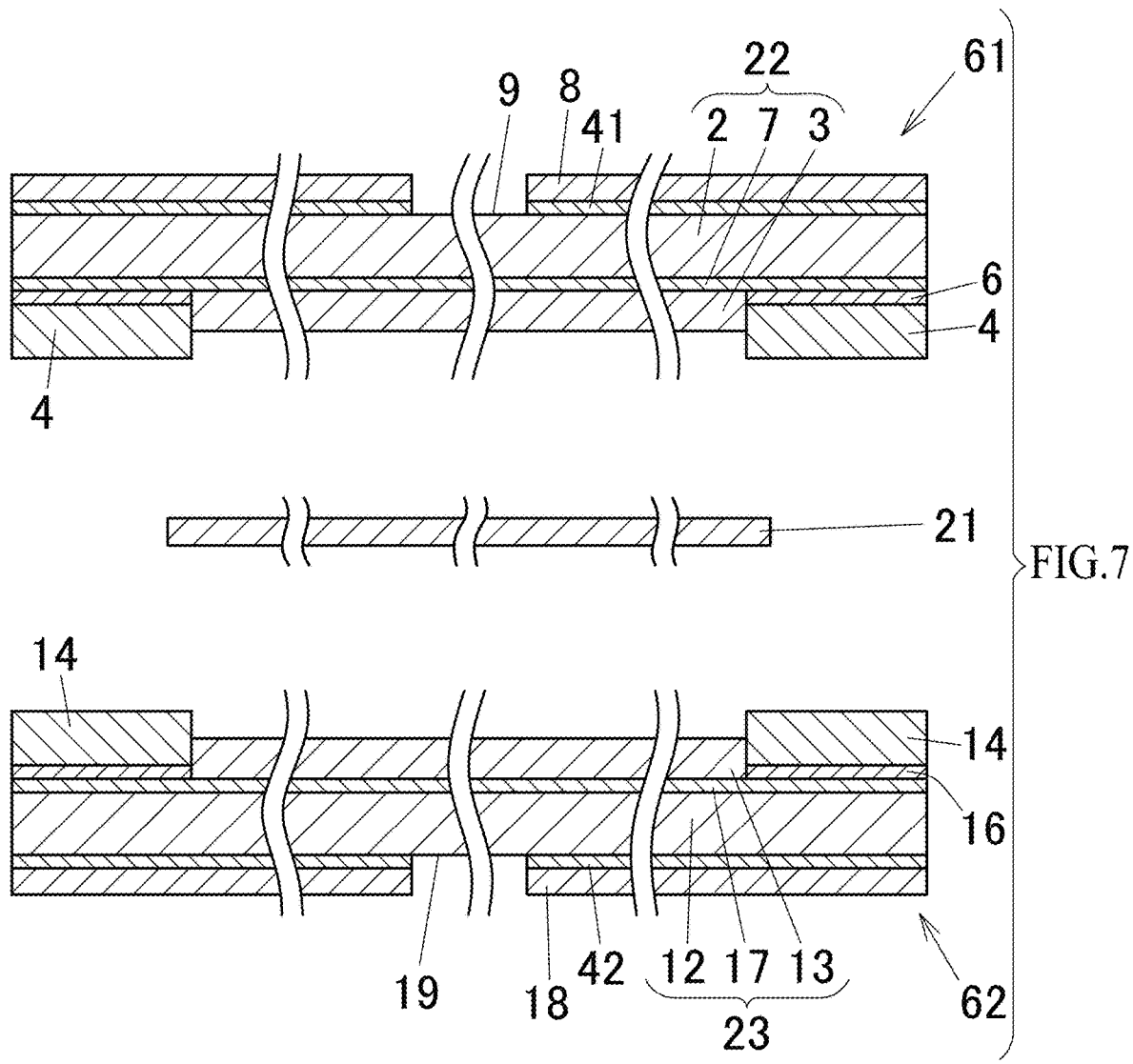
FIG. 7 is a cross-sectional view showing one example of a production method of a thin power storage device according to the present invention.

That is, a positive electrode side sheet body 61 is prepared in which the positive electrode active material layer 3 is laminated on the partial region of one surface of the first metallic foil layer 2 via the binder layer 7, the first thermoplastic resin layer 4 is laminated on the peripheral portion of the binder layer 7 laminated on the one surface of the first metallic foil layer 2 in which the positive electrode active material layer is not formed via the first peripheral adhesive agent layer 6, and the first insulation resin film layer 8 is laminated on the other surface of the first metallic foil layer 2 via the third adhesive agent layer 41 with the first metal exposed portion 9 through which the first metallic foil layer 2 is exposed remained (see FIG. 7). The first thermoplastic resin layer 4 is preferably formed by a thermoplastic resin unstretched film. Further, the first insulation resin film layer 8 is preferably formed by a heat-resistant resin stretched film.

Further, a negative electrode side sheet body 62 is prepared in which the negative electrode active material layer 13 is laminated on the partial region of one surface of the second metallic foil layer 12 via the binder layer 17, the second thermoplastic resin layer 14 is laminated on the peripheral portion of the binder layer 17 laminated on the one surface of the second metallic foil layer 12 in which the negative electrode active material layer is not formed via the second peripheral adhesive agent layer 16, and the second insulation resin film layer 18 is laminated on the other surface of the second metallic foil layer 12 via the fourth adhesive agent layer 42 with the second metal exposed portion 19 through which the second metallic foil layer 12 is exposed remained (see FIG. 7). The second thermoplastic resin layer 14 is preferably formed by a thermoplastic resin unstretched film. Further, the second insulation resin film layer 18 is preferably formed by a heat-resistant resin stretched film.

Further, the separator 21 is prepared. Thus, the positive electrode side sheet body 61 and the negative electrode side sheet body 62 are brought into contact with each other at the respective thermoplastic resin layers 4 and 14, and the separator 21 is arranged between the positive electrode active material layer 3 and the negative electrode active material layer 13. The peripheral portions of the overlapped positive electrode side sheet body 61 and negative electrode side sheet body 62 are sandwiched and pressed using heated plates, etc., to thereby heat-seal the first thermoplastic resin layer 4 and the second thermoplastic resin layer 14.

The aforementioned heat-sealing is performed as follows. Three sides of the peripheral portions of the overlapped positive electrode side sheet body 61 and negative electrode side sheet body 62 among the four sides thereof are initially heat-sealed to perform provisional sealing. Subsequently, electrolytes 5 and 15 are injected between the separator 21 and the positive electrode active material layer 3 and between the separator 21 and the negative electrode active material layer 13 from the remaining non-sealed side. Thereafter, the remaining non-sealed side is sandwiched and pressed by a pair of heated plates from above and below to completely seal and join the four sides to thereby obtain a thin power storage device 1 of the present invention shown in FIGS. 3 and 4. In the obtained thin power storage device 1, the first metal exposed portion 9 is exposed through the opening 8X at the central portion of the first insulation resin film layer 8 and the second metal exposed portion 19 is exposed through the opening 18X at the central portion of the second insulation resin film layer 18 (see FIGS. 3 and 4).

The aforementioned production method is a mere one example, and the present invention is not limited to the production method.

EXAMPLES

Next, concrete examples of the present invention will be explained, but the present invention is not specifically limited to these examples.

Example 1

(Production of Positive Electrode Side Sheet Body 61)

After applying a binder solution in which polyvinylidene fluoride (PVDF) as a binder was dissolved in a dimethylformamide (DMF) as a solvent to one surface (entire surface) of a hard aluminum foil (A1100 hard aluminum foil classified into JIS H4160) having a length 20 cm, a width 30 cm and a thickness 15 μm, it was dried at 100° C. for 30 seconds to form a binder layer 7 having a thickness of 0.5 μm after drying.

Figure 8A:
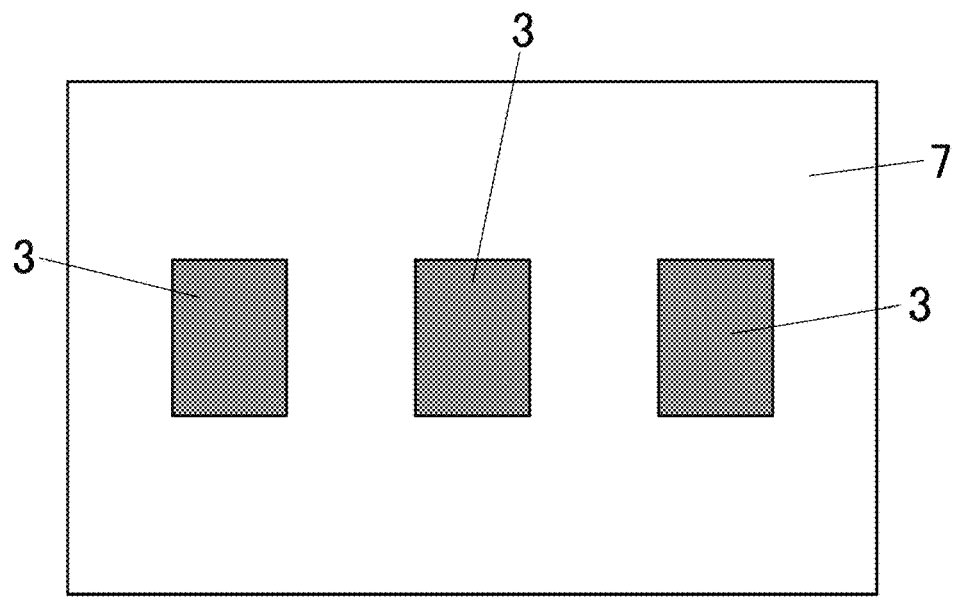

After applying a paste in which 60 parts by mass of a positive electrode active material having lithium cobalt oxide as a main component, 10 parts by mass of polyvinylidene fluoride (PVDF) as a binder and an electrolyte retention agent, 5 parts by mass of acetylene black (conductive material), and 25 parts by mass of N-methyl-2-pyrrolidone (NMP) (organic solvent) were kneaded and dispersed at three portions of the surface of the binder layer 7 with the size of 75 mm×44 mm, it was dried at 100° C. for 30 minutes, and then hot-press was performed. Thus, a positive electrode active material layer 3 having a density of 4.8 g/cm³ and a thickness of 30.2 μm after drying was formed (see FIG. 8A).

Figure 8B:
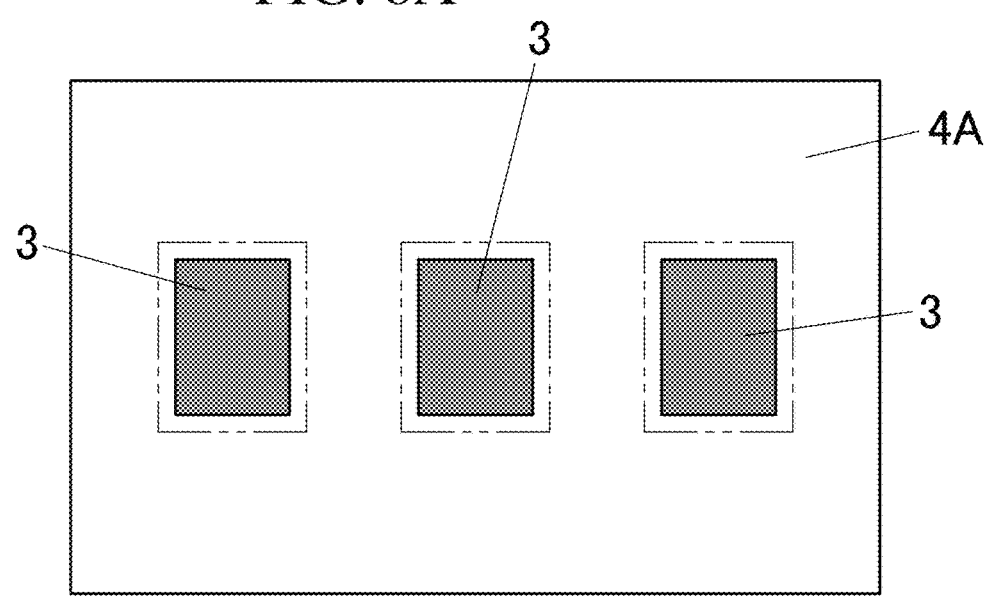

Next, after masking the positive electrode active material layer 3 by adhering polyester adhesive tapes having the same size to three portions of the positive electrode active material layer 3, a two-part curing type olefin adhesive agent (first peripheral adhesive agent layer) 6 was applied to form a thickness of 2 μm on a masked side surface, it was dried at 100° C. for 15 seconds. Subsequently, a non-stretched polypropylene film 4A having a thickness of 25 μm was further adhered on the first peripheral adhesive agent and left for three days in a constant temperature reservoir of 40° C. to perform curing. Thereafter, at the position corresponding to the outer periphery of the polyester adhesive tape (outer periphery of the positive electrode active material layer 3), only the non-stretched polypropylene film layer 4A was cut. Then, the non-stretched polypropylene film (only the inner portion of the cut portion; only the region corresponding to the adhesive tape) was removed together with the polyester adhesive tape, so that the surface of the positive electrode active material layer 3 was exposed (see FIG. 8B).

Next, three pieces of positive electrode side sheet bodies 61 each having a size of 85 mm×54 mm (see FIG. 8C, FIG. 7) were produced by cutting along the position (position corresponding to the two-dot chain line in FIG. 8B) positioned outward by 5 mm from the outer periphery of the exposed surface of the positive electrode active material layer 3.

Figure 8C:
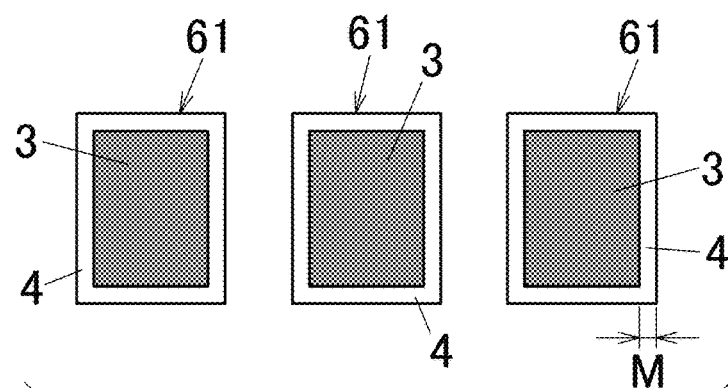

The width M of the first thermoplastic resin layer 4 formed by the non-stretched polypropylene film was 5 mm (see FIG. 8C).

(Production of Negative Electrode Side Sheet Body 62)

After applying a binder solution in which polyvinylidene fluoride (PVDF) as a binder was dissolved in a dimethylformamide (DMF) as a solvent to one surface (entire surface) of a hard copper foil (C1100R hard copper foil classified into JIS H3100) having a length 20 cm, a width 30 cm and a thickness 15 μm, it was dried at 100° C. for 30 seconds to form a binder layer 17 having a thickness of 0.5 μm after drying.

After applying a paste in which 57 parts by mass of a negative electrode active material having carbon powder as a main component, 5 parts by mass of polyvinylidene fluoride (PVDF) as a binder and electrolyte retention agent, 10 parts by mass of a copolymer of hexafluoropropylene and maleic anhydride, 3 parts by mass of acetylene black (conductive material), and 25 parts by mass of N-methyl-2-pyrrolidone (NMP) (organic solvent) were kneaded and dispersed at three portions of the surface of the binder layer 17 with the size of 75 mm×44 mm, it was dried at 100° C. for 30 minutes, and then hot-press was performed. Thus, a negative electrode active material layer 13 having a density of 1.5 g/cm³ and a thickness of 20.1 μm after drying was formed.

Next, after masking the negative electrode active material layer 13 by adhering polyester adhesive tapes having the same size to three portions of the negative electrode active material layer 13, a two-part curing type olefin adhesive agent (second peripheral adhesive agent layer) 16 was applied to form a thickness of 2 μm on a masked side surface, it was dried at 100° C. for 15 seconds. Subsequently, a non-stretched polypropylene film having a thickness of 25 μm was further adhered on the second peripheral adhesive agent and left for three days in a constant temperature reservoir of 40° C. to perform curing. Thereafter, at the position corresponding to the outer periphery of the polyester adhesive tape (outer periphery of a negative electrode active material layer 13), only the non-stretched polypropylene film layer was cut. Then, the non-stretched polypropylene film (only the inner portion of the cut portion; only the region corresponding to the adhesive tape) was removed together with the polyester adhesive tape, so that the surface of the negative electrode active material layer 13 was exposed.

Next, three pieces of negative electrode side sheet bodies 62 each having a size of 85 mm×54 mm (see FIG. 7) were produced by cutting along the position positioned outward by 5 mm from the outer periphery of the exposed surface of the negative electrode active material layer 13.

The width of the second thermoplastic resin layer 14 formed by the non-stretched polypropylene film was 5 mm.

(Production of Thin Power Storage Device 1)

Next, a porous wet separator 21 having a length 85 mm×a width 54 mm×a thickness 8 μm was arranged between the positive electrode side sheet body 61 and the negative electrode side sheet body 62 (see FIG. 7). At this time, the positive electrode side sheet body 61 was arranged such that the positive electrode active material layer 3 exists on the separator 21 side, and the negative electrode side sheet body 62 was arranged such that the negative electrode active material layer 13 exists on the separator 21 side.

Next, in a state in which the separator 21 was sandwiched and held by and between the positive electrode side sheet body 61 and the negative electrode side sheet body 62, the three sides thereof among the four sides as seen in a plan view were sandwiched and pressed with a pair of heated plates of 200° C. from the above and below at a pressure of 0.2 MPa for three seconds to thereby seal and join the three sides.

Next, an electrolyte in which lithium hexafluorophosphate (LiPF$_6$) was resolved at a concentration of 1 mol/L in a mixed solvent in which ethylene carbonate (EC), dimethyl carbonate (DMC), ethylmethyl carbonate (EMC) were blended at an equal amount volume ratio was injected by 0.5 mL from a non-sealed one side between the separator 21 and the positive electrode active material layer 3 and between the separator 21 and the negative electrode active material layer 13 using a syringe. Thereafter, vacuum sealing was performed to perform provisional sealing.

Thereafter, charging was performed until a battery voltage 4.2 V was generated to cause generation of gases from the electrodes, the separator, etc. Thereafter, in a discharging state of 3.0 V and under reduced pressure of 0.086 MPa, the remaining one un-sealed side was sandwiched and pressed by and between a pair of heated plates of 200° C. at a pressure of 0.2 MPa for three seconds to perform heat sealing. Thus, the four sides were completely sealed and joined, so that a card type thin power storage device (thin type simulated battery) 1 having a battery capacity of 20 mAh as shown in FIGS. 1 and 2 was obtained.

Example 2

A card type thin power storage device (thin simulated battery) 1 having a battery capacity of 20 mAh as shown in FIGS. 1 and 2 was obtained in the same manner as in Example 1 except that a hard stainless steel foil (SUS304) was used as the second metallic foil layer of the negative electrode part in place of a hard copper foil.

Example 3

A card type thin power storage device (thin simulated battery) 1 having a battery capacity of 20 mAh as shown in FIGS. 3 and 4 was obtained in the same manner as in Example 1 except that the following additional structure was further added to the positive electrode side sheet body 61 obtained in Example 1.

The following additional structure was added as explained below. That is, masking was performed by adhering a polyester adhesive tape having a size of 5 mm×5 mm to the central portion of the other surface (the opposite side surface opposite to the side in which the positive electrode active material layer 3 was formed) of the hard aluminum foil (first metallic foil layer) 2 of the positive electrode side sheet body 61 obtained in Example 1. Thereafter, to the entire surface side to which masking was performed, a polyester urethane-based adhesive agent (third adhesive agent layer) 41 was applied by a thickness of 2 μm and dried at 100° C. for 15 second. Subsequently, a biaxially stretched polyester film (first insulation resin film layer) 8 having a thickness of 12 μm was adhered on the third adhesive agent layer 41 and left in a constant temperature reservoir of 40° C. for three days to perform curing. Thereafter, cutting was formed only in the biaxially stretched polyester film at the position corresponding to the outer periphery of the polyester adhesive tape, and then the part of the biaxially stretched polyester film was removed together with the polyester adhesive tape to form an opening 8X at the central portion of the biaxially stretched polyester film, so that the first metal exposed portion 9 having a size of 5 mm×5 mm was exposed at the central portion of the other surface of the hard aluminum foil (first metallic foil layer) 2. Thus, the positive electrode side sheet body 61 shown in FIG. 7 was obtained.

Further, in the same manner, masking was performed by adhering a polyester adhesive tape having a size of 5 mm×5 mm to the central portion of the other surface (the opposite side surface opposite to the side in which the negative electrode active material layer 13 was formed) of the hard copper foil (second metallic foil layer) 12 of the negative electrode side sheet body 62 obtained in Example 1. Thereafter, to the entire surface side to which masking was performed, a polyester urethane-based adhesive agent (fourth adhesive agent layer) 42 was applied by a thickness of 2 μm and dried at 100° C. for 15 second. Subsequently, a biaxially stretched polyester film (second insulation resin film layer) 18 was adhered on the fourth adhesive agent layer 42 and left in a constant temperature reservoir of 40° C. for three days to perform curing. Thereafter, cutting was formed only in the biaxially stretched polyester film at the position corresponding to the outer periphery of the polyester adhesive tape, and then the part of the biaxially stretched polyester film was removed together with the polyester adhesive tape to form an opening 18X at the central portion of the biaxially stretched polyester film, so that the second metal exposed portion 19 having a size of 5 mm×5 mm was exposed at the central portion of the other surface of the hard copper foil (second metallic foil layer) 12. Thus, the negative electrode side sheet body 62 shown in FIG. 7 was obtained.

Using the positive electrode side sheet body 61 and the negative electrode side sheet body 62 obtained as mentioned above, in the same manner as in Example 1, a production process of the thin power storage device was performed to thereby obtain a thin power storage device (thin type simulated battery) 1 shown in FIGS. 3 and 4.

Comparative Example 1

Initially, as explained below, laminated packaging materials 151 and 152, a positive electrode tab lead 131, and a negative electrode tab lead 141 were prepared.
(Laminated Packaging Material)

A polyester film having a thickness of 12 μm was adhered to one surface of a soft aluminum foil (A8021 soft aluminum foil classified into JIS H4160) having a thickness of 20 μm via a polyester urethane-based adhesive agent, and a polypropylene film having a thickness of 25 μm was adhered to the other surface of the soft aluminum foil via a polyolefin adhesive agent. Thereafter, it was cured for three days in a constant temperature reservoir of 40° C. and then cut to thereby obtain a laminated packaging materials 151 and 152 each having a size of 85 mm×54 mm.
(Positive Electrode Tab Lead)

Figure 10A:
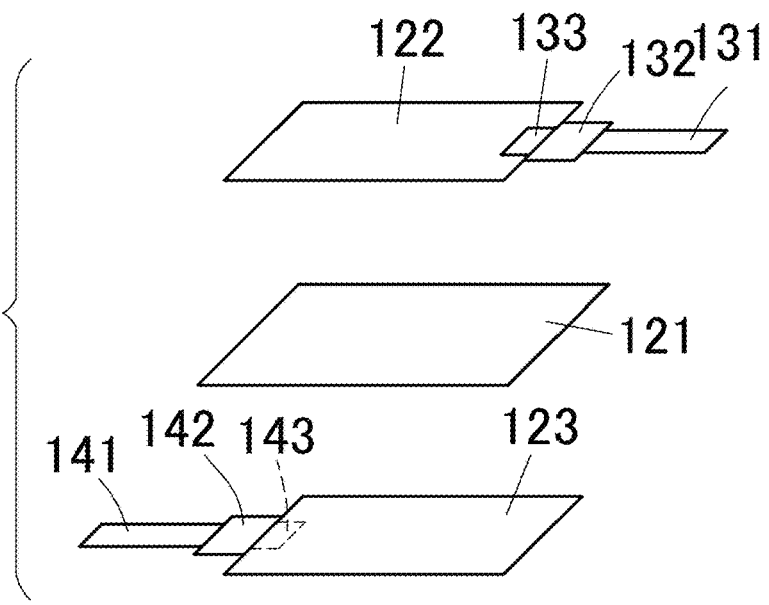
Figure 10B:
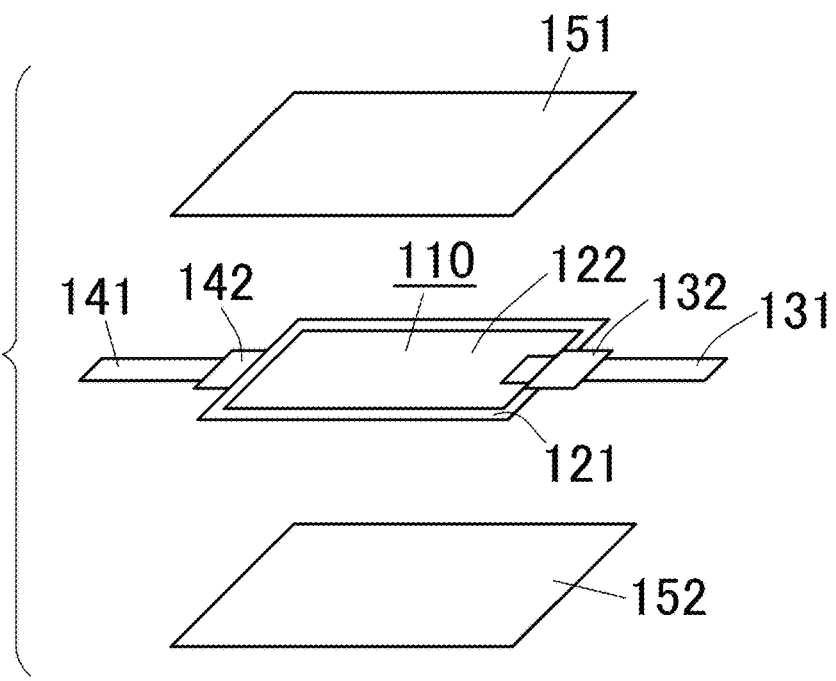
Figure 10C:
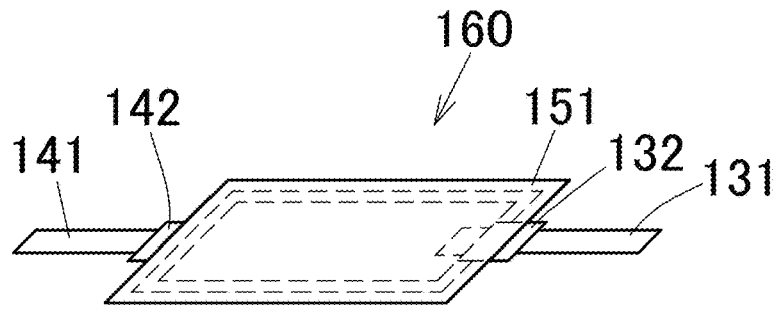

An insulation film 132 made of a maleic anhydride-modified polypropylene film (fusing point: 140° C., melt flow rate (MFR): 3.0 g/10 minutes) having a length 10 mm, a width 5 mm, and a thickness 50 μm was sandwiched and pressed by heat seal on both surfaces of the partial region inner than the position within 5 mm from a longitudinal one end of a hard aluminum plate (A1050 hard aluminum foil classified into JIS H4000) having a length 40 mm, a width 3 mm, and a thickness 500 μm, so that the positive electrode tab lead 131 shown in FIGS. 10A, 10B, and 10C was obtained.
(Negative Electrode Tab Lead)

An insulation film 142 made of a maleic anhydride-modified polypropylene film (fusing point: 140° C., melt flow rate (MFR): 3.0 g/10 minutes) having a length 10 mm, a width 5 mm, and a thickness 50 μm was sandwiched and pressed by heat seal on both surfaces of the partial region inner than the position within 5 mm from a longitudinal one end of a nickel plate having a length 40 mm, a width 3 mm, and a thickness 500 μm, so that the negative electrode tab lead 141 shown in FIGS. 10A, 10B, and 10C was obtained.

(Production of Thin Power Storage Device 160)

After applying a binder solution in which polyvinylidene fluoride (PVDF) as a binder was dissolved in a dimethyl-formamide (DMF) as a solvent to one surface (entire surface) of a hard aluminum foil (A1100 hard aluminum foil classified into JIS H4160) having a length 20 cm, a width 30 cm and a thickness 15 μm, it was dried at 100° C. for 30 seconds to form a binder layer having a thickness of 0.5 μm after drying.

After applying a paste in which 60 parts by mass of a positive electrode active material having lithium cobalt oxide as a main component, 10 parts by mass of polyvinylidene fluoride (PVDF) as a binder and an electrolyte retention agent, 5 parts by mass of acetylene black (conductive material), and 25 parts by mass of N-methyl-2-pyrrolidone (NMP) (organic solvent) were kneaded and dispersed to a surface of a binder layer of the hard aluminum foil, it was dried at 100° C. for 30 minutes, and then hot-press was performed. Thus, a positive electrode active material layer having a density of 4.8 g/cm$^3$ and a thickness of 30.2 μm after drying was formed. Thereafter, it was cut to obtain a positive electrode 122 having a size of 75 mm×45 mm.

A longitudinal one end portion of the positive electrode tab lead 131 (one end portion to which the insulation film 132 was attached) was overlapped on a longitudinal one end portion of the active material non-applied surface (opposite side surface to which the positive electrode active material layer was formed) of the positive electrode 122, and the overlapped portion was welded with an ultrasonic welder (see FIG. 10A). In FIG. 10A, "133" denotes a welded portion.

After applying a binder solution in which polyvinylidene fluoride (PVDF) as a binder was dissolved in a dimethyl-formamide (DMF) as a solvent to one surface (entire surface) of a hard copper foil (C1100R hard copper foil classified into JIS H3100) having a length 20 cm, a width 30 cm and a thickness 15 μm, it was dried at 100° C. for 30 seconds to form a binder layer having a thickness of 0.5 μm after drying.

After applying a paste in which 100 parts by mass of a negative electrode active material having carbon powder as a main component, 5 parts by mass of polyvinylidene fluoride (PVDF) as a binder and an electrolyte retention agent, 10 parts by mass of a copolymer of hexafluoropropylene and maleic anhydride, 3 parts by mass of acetylene black (conductive material), and 25 parts by mass of N-methyl-2-pyrrolidone (NMP) (organic solvent) were kneaded and dispersed to a surface of a binder layer of the hard copper foil, it was dried at 100° C. for 30 minutes, and then hot-press was performed. Thus, a negative electrode active material layer having a density of 1.5 g/cm$^3$ and a thickness of 20.1 μm after drying was formed. Then, it was cut to thereby obtain a negative electrode 123 having a size of 75 mm×45 mm.

A longitudinal one end portion of the negative electrode tab lead 141 (one end portion to which the insulation film 142 was attached) was overlapped on a longitudinal one end portion of the active material non-applied surface (opposite side surface to which the negative electrode active material layer was formed) of the negative electrode 123, and the overlapped portion was welded with an ultrasonic welder (see FIG. 10A). In FIG. 10A, "143" denotes a welded portion.

Next, as shown in FIG. 10A, the separator 121 was sandwiched between the positive electrode 122 to which the positive electrode tab lead 131 was joined and the negative electrode 123 to which the negative electrode tab lead 141 was joined in a laminated manner, so that an electrode main body 110 was structured (see FIG. 10B). At this time, the positive electrode active material layer was positioned on the separator 121 side of the positive electrode 122 and the negative electrode active material layer was positioned on the separator 121 side of the negative electrode 123, and the tab leads 131 and 141 were positioned so as to be positioned oppositely in the right and left direction so that the positive electrode tab lead 131 and the negative electrode tab lead 141 were not overlapped (see FIG. 10B).

Next, as shown in FIG. 10B, the electrode main body 110 was arranged between a pair of upper and lower laminated packaging materials 151 and 152. At this time, the polypropylene films (heat sealing layers) of the laminated packaging materials 151 and 152 were arranged so as to be positioned on the inner side (electrode main body 110 side).

Thereafter, in a state in which the electrode main body 110 was sandwiched and held by and between the pair of upper and lower laminated packaging materials 151 and 152, the three sides thereof among the four sides as seen in a plan view were sandwiched and pressed with a pair of heated plates of 200° C. from the above and below at a pressure of 0.2 MPa for three seconds to thereby seal and join the three sides.

Next, an electrolyte in which lithium hexafluorophosphate (LiPF6) was resolved at a concentration of 1 mol/L in a mixed solvent in which ethylene carbonate (EC), dimethyl carbonate (DMC), ethylmethyl carbonate (EMC) were blended at an equal amount volume ratio was injected by 0.5 mL from a non-sealed one side between the separator 121 and the positive electrode active material layer and between the separator 121 and the negative electrode active material layer using a syringe. Thereafter, vacuum sealing was performed to perform a provisional sealing.

Thereafter, charging was performed until a battery voltage 4.2 V was generated to cause generation of gases from the electrodes, the separator, etc. Thereafter, in a discharging state of 3.0 V and under reduced pressure of 0.086 MPa, the remaining one un-sealed side was sandwiched and pressed by and between a pair of heated plates of 200° C. from the above and below at a pressure of 0.2 MPa for three seconds to perform heat sealing. Thus, the four sides were completely sealed and joined, so that a card type thin power storage device (thin type simulated battery) 160 having a battery capacity of 20 mAh as shown in FIG. 10C was obtained.

TABLE 1

| | Each structure of card type battery | | | | | | Evaluation Results | | | | |
| | Positive electrode (after press) | | Negative electrode (after press) | | | | | | | | |
| | Density (g/cm³) | Thickness of active material layer (μm) | Density (g/cm³) | Thickness of active material layer (μm) | Lightness Mass (g) | Thinness Thickness of the thickest portion (μm) | Discharge capacity ratio (%) | | | | Inner resistance value (mΩ) |
| | | | | | | | Immediately after charging | After leaving at 40° C. | After leaving at 60° C. | After leaving at 80° C. | |
|---|---|---|---|---|---|---|---|---|---|---|---|
| Ex. 1 | 4.8 | 30.2 | 1.5 | 20.1 | 1.541 | 80 | 100 | 98 | 96 | 92 | 35 |
| Ex. 2 | 4.8 | 30.2 | 1.5 | 20.1 | 1.453 | 80 | 100 | 95 | 94 | 92 | 34 |
| Ex. 3 | 4.8 | 30.2 | 1.5 | 20.1 | 1.602 | 104 | 100 | 98 | 96 | 92 | 35 |
| Comp. Ex. 1 | 4.8 | 30.2 | 1.5 | 20.1 | 2.235 | 148 | — | 96 | 95 | 92 | 42 |

For each thin power storage device (thin simulated battery) of Examples 1 to 3 and Comparative Example 1, evaluations were made based on the following evaluation method.

<Evaluation Method of Lightness and Thinness>

The entire mass (g) of each thin power storage device was measured to investigate the lightness, and the thickness (μm) of the thickest portion of the thin power storage device was measured to investigate the thinness.

<Evaluation Method of Discharge Capacity Ratio>

For each thin power storage device, four samples were prepared respectively. A discharge capacity ratio (discharge capacity ratio immediately after charging) when the first sample of each thin power storage device was charged with a charging current of 10 mA until it becomes 4.2 V and then discharged to 3.0 V at the current value of 10 mA was measured, and the internal resistance value of the thin power storage device was measured using an internal resistance measuring instrument.

The "discharge capacity ratio immediately after charging" in each Example is a value calculated by the following calculating formula.

Discharge capacity ratio (%)=(Discharge capacity measured value immediately after charging of each Example)÷(Discharge capacity measured value immediately after charging of Comparative Example 1)×100

(Discharge Capacity Ratio after Leaving at 40° C.)

A discharge capacity ratio when the second sample of each thin power storage device was charged with a charging current of 10 mA until it becomes 4.2 V and left in a constant temperature reservoir at 40° C. for seven days, then taken out from the reservoir, and discharged to 3.0 V at the current value of 10 mA (discharge capacity ratio immediately after charging at 40° C.) was measured.

The "discharge capacity ratio after leaving at 40° C." in each Example is a value calculated by the following calculating formula.

Discharge capacity ratio after leaving at 40° C. (%)=(Discharge capacity measured value after leaving at 40° C. of each Example)÷(Discharge capacity measured value immediately after charging of Comparative Example 1)×100

While, the "discharge capacity ratio after leaving at 40° C." in Comparative Example 1 is a value calculated by the following calculating formula.

Discharge capacity ratio after leaving at 40° C. (%)=(Discharge capacity measured value after leaving at 40° C. of Comparative Example 1)÷(Discharge capacity measured value immediately after charging of Comparative Example 1)×100

(Discharge capacity ratio after leaving at 60° C.)

A discharge capacity ratio when the third sample of each thin power storage device was charged with a charging current of 10 mA until it becomes 4.2 V and left in a constant temperature reservoir at 60° C. for seven days, then taken out from the reservoir, and discharged to 3.0 V at the current value of 10 mA (discharge capacity ratio after leaving at 60° C.) was measured. The calculating formula of "discharge capacity ratio after leaving at 60° C." conform to the calculating formula of the aforementioned "discharge capacity ratio after leaving at 40° C."

(Discharge Capacity Ratio after Leaving at 80° C.)

A discharge capacity ratio when the third sample of each thin power storage device was charged with a charging current of 10 mA until it becomes 4.2 V and left in a constant temperature reservoir at 80° C. for seven days, then taken out from the reservoir, and discharged to 3.0 V at the current value of 10 mA (discharge capacity ratio after leaving at 80° C.) was measured. The calculating formula of "discharge capacity ratio after leaving at 80° C." conform to the calculating formula of the aforementioned "discharge capacity ratio after leaving at 40° C."

As will be apparent from Table 1, the thin power storage devices of Examples 1 to 3 are lighter and thinner as compared with a conventional type of Comparative Example 1. In the power storage device of Comparative Example 1, since tab leads are required (tab leads exist), as compared with Examples 1 to 3, the mass is relatively large, and the heat sealed portion in which the tab leads 131 and 141 are sandwiched by the upper and lower packaging materials 151 and 152 is considerably increased in thickness.

Further, the discharge capacity ratio immediately after charging is 100%, and the discharge capacity ratio after leaving at 80° C. is 92%, which is a level causing no problem as compared with a lithium-ion battery armored by a common metallic can. Further, the internal resistance value is also reduced. It is understood that the thin power storage device of the present invention is reduced in weight and thickness, and is excellent in basic performance as a lithium-ion battery.

TABLE 2

|  | Voltage (V) | Capacity value (mAh) |
| --- | --- | --- |
| Example 1 | 4.192 | 19.6 |
| Module*[1)] | 11.85 | 19.8 |

*[1)]Module in which three batteries of Example 1 are connected in series.

Next, a module in which three thin power storage devices of Example 1 were laminated in series in a manner shown in FIGS. 5 and 6 was produced. These were connected in series without providing the positive electrode side conductive layer 51, and the negative electrode side conductive layer 52.

As will be apparent from Table 2, the voltage of the module was 11.85 V and the capacity value was 19.8 mAh. Thus, it is understood that the module in which a plurality of thin power storage devices of the present invention were connected in series is excellent in basic performance as a lithium-ion battery.

The thin power storage device according to the present invention can be exemplified by, for example, a thin electrochemical device such as a thin lithium secondary battery (a lithium-ion battery, a lithium polymer battery, etc.), a thin lithium-ion capacitor, and a thin electric double layer capacitor.

The thin power storage device according to the present invention can be preferably used as, for example, a backup power supply for IC cards, but not limited to it. Further, although the thin power storage device of the present invention can be preferably used as a power source for various mobile electronic devices such as a smart phone or a tablet-type terminal by connecting a plurality of thin power storage devices in a laminated manner, but not limited to such a usage.

Further, the power storage device module 50 in which a plurality of thin power storage devices 1 of the present invention are laminated in the thickness direction and structured into a cylindrical shape as shown in FIGS. 9A and 9B can be used as, for example, a battery for an electronic cigarette, a battery for a pen light, an auxiliary battery for a personal computer, etc.

The present invention claims priority to Japanese Patent Application No. 2014-165690 filed on Aug. 18, 2014 and Japanese Patent Application No. 2015-137011 filed on Jul. 8, 2015, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

The invention claimed is:

1. A production method of a thin power storage device, comprising:
    a step of preparing a positive electrode side sheet body including a first metallic foil layer, a positive electrode active material layer laminated on a partial region of one surface of the first metallic foil layer, and a first thermoplastic resin layer provided at a peripheral portion of the one surface of the first metallic foil layer on which the positive electrode active material layer is not formed;
    a step of preparing a negative electrode side sheet body including a second metallic foil layer, a negative electrode active material layer laminated on a partial region of one surface of the second metallic foil layer, and a second thermoplastic resin layer provided at a peripheral portion of the one surface of the second metallic foil layer on which the negative electrode active material layer is not formed;
    a step of preparing a separator; and
    a step of heat-sealing the first thermoplastic resin layer of the positive electrode side sheet body and the second thermoplastic resin layer of the negative electrode side sheet body in a state in which the positive electrode side sheet body and the negative electrode side sheet body are in contact with each other via respective thermoplastic resin layers and the separator is sandwiched by and between the positive electrode active material layer and the negative electrode active material layer.

2. The production method of a thin power storage device as recited in claim 1,
    wherein the first thermoplastic resin layer is formed by a thermoplastic resin unstretched film and the second thermoplastic resin layer is formed by a thermoplastic resin unstretched film.

* * * * *